US012003865B2

(12) United States Patent
Kamiya et al.

(10) Patent No.: US 12,003,865 B2
(45) Date of Patent: Jun. 4, 2024

(54) SIGNAL PROCESSING DEVICE, SIGNAL PROCESSING METHOD, CAMERA SYSTEM, VIDEO SYSTEM, AND SERVER

(71) Applicant: SONY GROUP CORPORATION, Tokyo (JP)

(72) Inventors: Koji Kamiya, Kanagawa (JP); Hiroaki Kikuchi, Kanagawa (JP); Jun Onuki, Kanagawa (JP); Tomoyuki Endo, Tokyo (JP); Masaki Hirose, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 168 days.

(21) Appl. No.: 17/539,996

(22) Filed: Dec. 1, 2021

(65) Prior Publication Data

US 2022/0094837 A1  Mar. 24, 2022

Related U.S. Application Data

(63) Continuation of application No. 16/099,803, filed as application No. PCT/JP2017/023452 on Jun. 26, 2017, now Pat. No. 11,223,778.

(30) Foreign Application Priority Data

Jun. 27, 2016 (JP) ................... 2016-126933
Jun. 23, 2017 (JP) ................... 2017-123489

(51) Int. Cl.
*H04N 23/741* (2023.01)
*G06T 1/20* (2006.01)
(Continued)

(52) U.S. Cl.
CPC ............ *H04N 23/741* (2023.01); *G06T 1/20* (2013.01); *H04N 5/202* (2013.01); *H04N 19/46* (2014.11);
(Continued)

(58) Field of Classification Search
CPC ...... H04N 23/741; H04N 5/202; H04N 19/46; H04N 19/98; H04N 21/2343;
(Continued)

(56) References Cited

U.S. PATENT DOCUMENTS

2006/0031889 A1  2/2006  Bennett et al.
2009/0284652 A1  11/2009  Bennett et al.
(Continued)

FOREIGN PATENT DOCUMENTS

CN    105393549 A    3/2016
JP    2015-126377 A    7/2015
(Continued)

OTHER PUBLICATIONS

International Search Report dated Sep. 19, 2017 in PCT/JP2017/023452, 2 pages.
(Continued)

*Primary Examiner* — Nhan T Tran
(74) *Attorney, Agent, or Firm* — Oblon, McClelland, Maier & Neustadt, L.L.P.

(57) ABSTRACT

To enable HDR video signals of a plurality of signal interfaces to be satisfactorily handled.
[Solution] A processing unit processes a linear high dynamic range video signal and obtains a high dynamic range video signal that has undergone a grayscale compression process. The processing unit is able to perform grayscale compression processes of a plurality of signal interfaces. For example, when a grayscale compression process of another signal interface other than a reference signal interface is performed, the processing unit further performs a process of adding characteristics of system gamma of the reference signal interface and a process of cancelling out characteristics of system gamma of the other signal interface.

18 Claims, 22 Drawing Sheets

(51) Int. Cl.
*H04N 5/202* (2023.01)
*H04N 19/46* (2014.01)
*H04N 19/98* (2014.01)
*H04N 21/2343* (2011.01)
*H04N 21/4402* (2011.01)
*H04N 23/67* (2023.01)
*H04N 23/80* (2023.01)
*H04N 25/615* (2023.01)

(52) U.S. Cl.
CPC ......... *H04N 19/98* (2014.11); *H04N 21/2343* (2013.01); *H04N 21/4402* (2013.01); *H04N 23/67* (2023.01); *H04N 23/80* (2023.01); *H04N 25/6153* (2023.01)

(58) Field of Classification Search
CPC .... H04N 21/4402; H04N 23/67; H04N 23/80; H04N 25/6153; H04N 23/663; H04N 23/50; G06T 1/20
See application file for complete search history.

(56) References Cited

U.S. PATENT DOCUMENTS

| | | | |
|---|---|---|---|
| 2012/0007875 A1* | 1/2012 | Sethuraman | G06F 3/1431 345/545 |
| 2015/0245044 A1* | 8/2015 | Guo | H04N 19/124 375/240.03 |
| 2015/0249848 A1 | 9/2015 | Holman et al. | |
| 2016/0142714 A1* | 5/2016 | Toma | H04N 21/4622 375/240.25 |
| 2016/0316187 A1 | 10/2016 | Kitajima | |
| 2016/0330513 A1 | 11/2016 | Toma | |
| 2017/0111643 A1* | 4/2017 | Bugdayci Sansli | H04N 19/184 |
| 2017/0186141 A1* | 6/2017 | Ha | H04N 9/646 |
| 2018/0242006 A1* | 8/2018 | Kerofsky | H04N 19/85 |
| 2018/0261184 A1* | 9/2018 | Ninan | H04N 5/202 |
| 2018/0367778 A1 | 12/2018 | Borer | |
| 2019/0052908 A1 | 2/2019 | Mertens | |
| 2019/0075296 A1 | 3/2019 | Toma et al. | |

FOREIGN PATENT DOCUMENTS

| | | |
|---|---|---|
| JP | 2016/111692 A | 6/2016 |
| WO | WO 2015/198560 A1 | 12/2015 |
| WO | WO 2016/063475 A1 | 4/2016 |

OTHER PUBLICATIONS

Extended European Search Report dated Jul. 16, 2019 in corresponding European Patent Application No. 17820112.5, 11 pages.
Anonymous: "Report ITU-R BT.2390-0 High Dynamic Range Television for Production and International Programme Exchange BT Series Broadcasting Service (Television)", XP055383019, Apr. 8, 2016, 40 pages, Retrieved from the Internet: URL:https://www.itu.int/dms_pub/itu-r/opb/rep/R-REP-BT.2390-2016-PDF-E.pdf [retrieved on Jun. 20, 2017].

* cited by examiner

FIG. 14
(a)
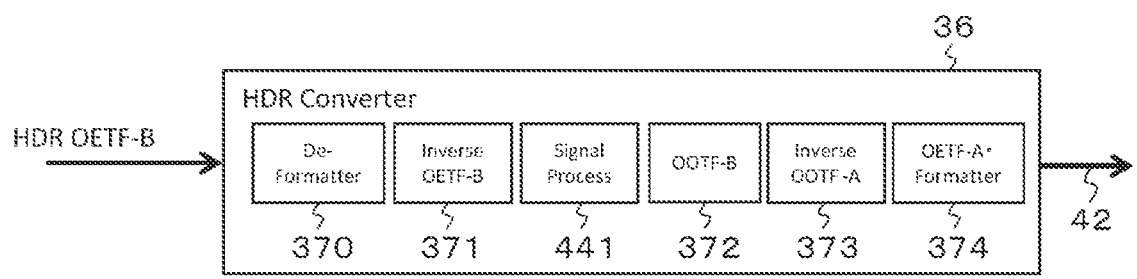
(b)
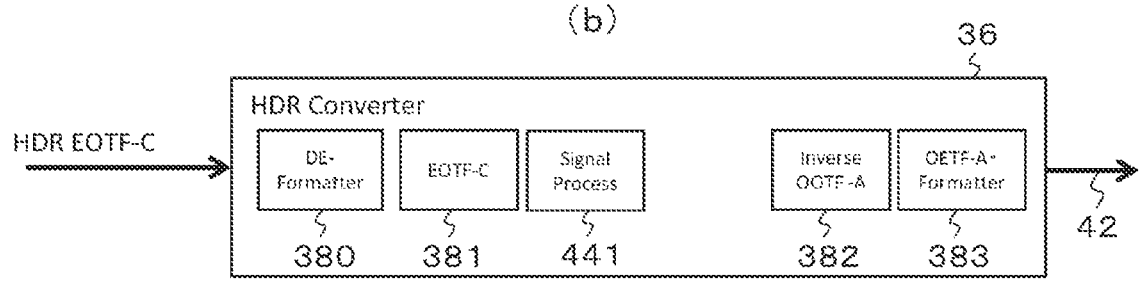

FIG. 17
(a)
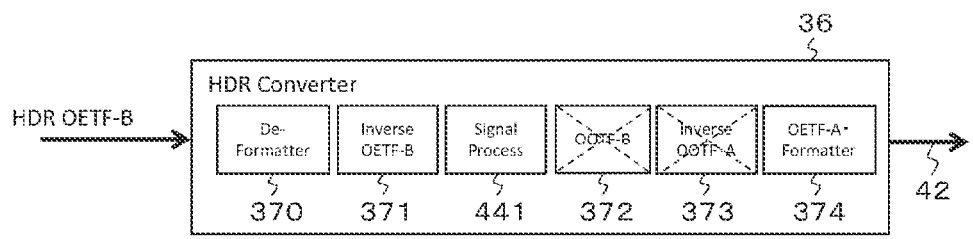
(b)
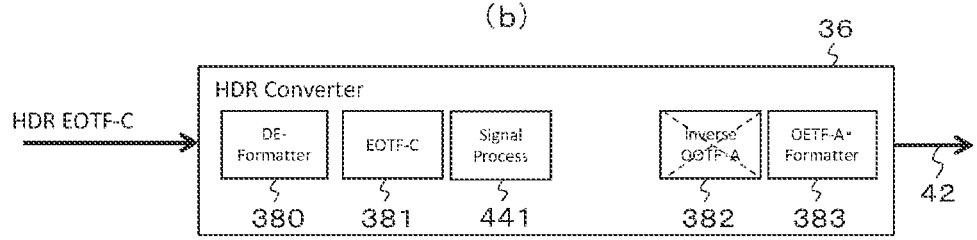
FIG. 18
(a)
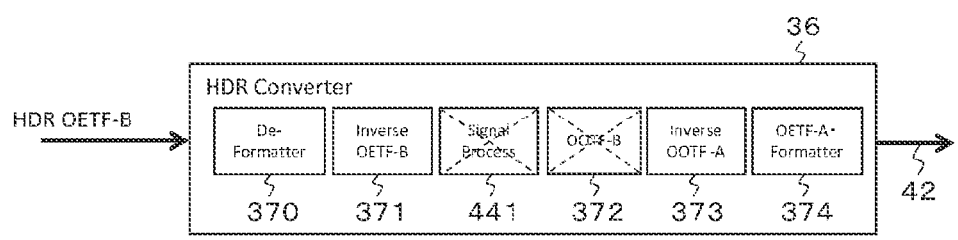
(b)
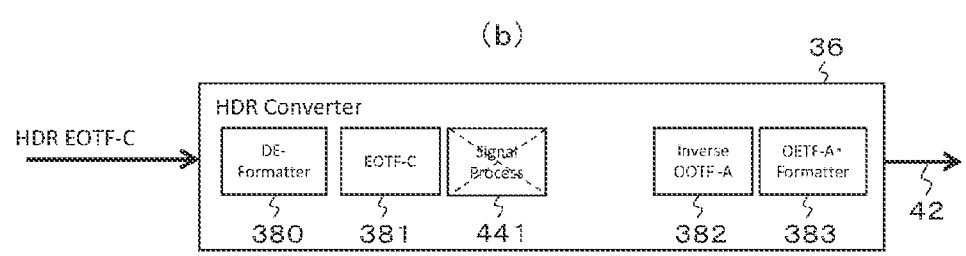

FIG. 22

| | Recording-Time OETF | Recording-Time Color Gamut | Output OETF | Output Color Gamut | | Recording-Time Inverse OETF | Recording-Time OOTF | Color Gamut Conversion | Linear Gain | Output Inverse OOTF | Output OETF |
|---|---|---|---|---|---|---|---|---|---|---|---|
| (a) | S-Log3 | BT.2020 | SDR | BT.709 | ⇐ | S-Log3 Inverse OETF | S-Log3 OOTF | BT.2020 → BT.709 Matrix | Minus Gain | NONE | SDR Inverse EOTF |
| (b) | SDR | BT.709 | S-Log3 | BT.2020 | ⇐ | SDR EOTF | NONE | BT.709 → BT.2020 Matrix | Plus Gain | S-Log3 Inverse OOTF | S-Log3 OETF |
| (c) | HLG | BT.2020 | S-Log3 | BT.2020 | ⇐ | HLG Inverse OETF | HLG OOTF | NONE | NONE | S-Log3 Inverse OOTF | S-Log3 OETF |
| (d) | PQ | BT.2020 | S-Log3 | BT.2020 | ⇐ | PQ EOTF | NONE | NONE | NONE | S-Log3 Inverse OOTF | S-Log3 OETF |

SIGNAL PROCESSING DEVICE, SIGNAL PROCESSING METHOD, CAMERA SYSTEM, VIDEO SYSTEM, AND SERVER

RELATED APPLICATIONS

This application is a continuation U.S. application Ser. No. 16/099,803, filed on Nov. 8, 2018, which is a '371 National Phase of International Application No. PCT/JP2017/023452, filed on Jun. 26, 2017, which claims priority to Japanese Patent Applications No. 2016-126933, filed on Jun. 27, 2016 and No. 2017-123489, filed on Jun. 23, 2017. The entire disclosures of the prior applications are hereby incorporated by reference in their entirety.

TECHNICAL FIELD

The present technology relates to a signal processing device, a signal processing method, a camera system, a video system, and a server, and particularly relates to a signal processing device that handles high dynamic range video signals, and the like.

BACKGROUND ART

Cameras that output high dynamic range (HDR) video signals are known in the related art (e.g., refer to Patent Literature 1). Various signal interfaces have been suggested as signal interfaces for HDR video signals. As a signal interface, for example, Hybrid Log-Gamma (HLG), Perceptual Quantizer (PQ), S-Log 3, and the like are known.

When signal interfaces vary, an opto-electrical transfer function (OETF) for performing a grayscale compression process and an electro-optical transfer function (EOTF) for performing a grayscale decompression process differ, and an opto-optical transfer function that is a video correction characteristic during display of a monitor also differs.

With regard to an OETF and an EOTF, basically an OETF of an output side and an EOTF of a reception side cancel out each other. Thus, even if HDR video signal interfaces vary and thus an OETF and an EOTF vary, an actual impact on a video displayed on a monitor is small. However, since an OOTF is a video correction characteristic during display of a monitor, if signal interfaces vary and thus the OOTF varies, a video displayed on the monitor may look different even with the same video signal (camera video).

CITATION LIST

Patent Literature

Patent Literature 1: JP 2015-115789A

DISCLOSURE OF INVENTION

Technical Problem

An objective of the present technology is to enable HDR video signals of a plurality of signal interfaces to be satisfactorily handled.

Solution to Problem

A concept of the present technology is a signal processing device including: a processing unit configured to process a linear high dynamic range video signal and obtain a high dynamic range video signal that has undergone a grayscale compression process. The processing unit is able to perform grayscale compression processes of a plurality of signal interfaces.

In the present technology, the processing unit processes a linear high dynamic range (HDR) video signal and obtains a high dynamic range video signal that has undergone a grayscale compression process. For example, an imaging unit obtains a linear HDR video signal. The processing unit is able to perform the grayscale compression processes of a plurality of signal interfaces.

In the present technology described above, the processing unit is able to perform the grayscale compression processes of the plurality of signal interfaces. Thus, HDR video signals that have undergone the grayscale conversion processes of the plurality of signal interfaces can be obtained, and thereby usability can be improved.

Note that in the present technology, for example, the processing unit may further perform at least a process of adding characteristics of system gamma of a reference signal interface when a grayscale compression process of another signal interface other than the reference signal interface is performed.

In this case, in a case in which an HDR video signal that has undergone a grayscale compression process of another signal interface is monitored on a monitor compatible with the interface, the video has undergone signal processing that makes it identical to a video appearing in a case in which an HDR video signal that has undergone the grayscale compression process of the reference signal interface is monitored on a monitor compatible with the interface (reference monitor). Thus, even in a case in which an HDR video signal that has undergone a grayscale compression process of another signal interface other than the reference signal interface is to be output, camera adjustment (video adjustment) can be performed on the basis of a video on the reference monitor.

In addition, another concept of the present technology is a signal processing device including: a processing unit configured to process the linear high dynamic range video signal and thereby obtain a high dynamic range video signal that has undergone a grayscale compression process of a reference signal interface; and a signal conversion unit configured to convert the high dynamic range video signal that has undergone the grayscale compression process of the reference signal interface into a high dynamic range video signal that has undergone a grayscale compression process of another signal interface other than the reference signal interface. The signal conversion unit performs at least each process of a grayscale decompression process corresponding to the grayscale compression process of the reference signal interface, a process of adding characteristics of system gamma of the reference signal interface, and a grayscale compression process of the other signal interface on the high dynamic range video signal that has undergone the grayscale compression process of the reference signal interface.

In the present technology, the processing unit processes a linear high dynamic range (HDR) videos signal and obtains an HDR video signal that has undergone the grayscale compression process of the reference signal interface. For example, an imaging unit obtains a linear HDR video signal. The signal conversion unit converts the HDR video signal that has undergone the grayscale compression process of the reference signal interface into a high dynamic range video signal that has undergone a grayscale compression process of another signal interface other than the reference signal interface.

The signal conversion unit performs a process of converting the high dynamic range video signal that has undergone the grayscale compression process of the reference signal interface into a state in which a grayscale compression process of another signal interface has been performed. That is, the signal conversion unit performs the grayscale decompression process corresponding to the grayscale compression process of the reference signal interface and the grayscale compression process of the other signal interface on the HDR video signal that has undergone the grayscale compression process of the reference signal interface. Furthermore, the signal conversion unit performs at least the process of adding the characteristics of system gamma of the reference signal interface to the HDR video signal that has undergone the grayscale compression process of the reference signal interface.

In the present technology described above, the signal conversion unit performs at least the process of adding the characteristics of the system gamma of the reference signal interface to the HDR video signal that has undergone the grayscale compression process of the reference signal interface.

In this case, in a case in which an HDR video signal that has undergone a grayscale compression process of another signal interface obtained by the signal conversion unit is monitored on a monitor compatible with the interface, the video is identical to a video appearing in a case in which an HDR video signal that has undergone the grayscale compression process of the reference signal interface is monitored on a monitor compatible with the interface (reference monitor). Thus, even in a case in which an HDR video signal that has undergone a grayscale compression process of another signal interface other than the reference signal interface is obtained and used by the signal conversion unit, camera adjustment (video adjustment) can be performed on the basis of a video on the reference monitor.

In addition, another concept of the present technology is a video system including: an input unit including a plurality of input apparatuses that input a high dynamic range video signal that has undergone a grayscale compression process of a reference signal interface; an extraction unit configured to selectively extract a predetermined high dynamic range video signal from the plurality of input apparatuses; and an output unit configured to output a video signal based on the predetermined high dynamic range video signal. The output unit is able to output at least a high dynamic range video signal that has undergone a grayscale compression process of another high dynamic range video signal interface other than the reference high dynamic range interface, in addition to the high dynamic range video signal that has undergone the grayscale compression process of the reference high dynamic range interface, and the output unit obtains the high dynamic range video signal that has undergone the grayscale compression process of the other signal interface by performing at least each process of a grayscale decompression process corresponding to the grayscale compression process of the reference signal interface, a process of adding characteristics of system gamma of the reference signal interface, and the grayscale compression process of the other signal interface on the predetermined high dynamic range video signal when the high dynamic range video signal that has undergone the grayscale compression process of the other signal interface is to be output.

The video system of the present technology has the input unit, the extraction unit, and the output unit. The input unit has the plurality of input apparatuses that input a high dynamic range (HDR) video signal that has undergone the grayscale compression process of the reference signal interface. The extraction unit selectively extracts a predetermined HDR video signal from the plurality of input apparatuses.

The output unit outputs a video signal on the basis of a predetermined HDR video signal. The output unit is able to output at least an HDR video signal that has undergone a grayscale compression process of another signal interface other than the reference signal interface in addition to the HDR video signal that has undergone the grayscale compression process of the reference signal interface.

In addition, when an HDR video signal that a undergone the grayscale compression process of another signal interface is to be output, the output unit performs a process of converting a predetermined HDR video signal (an HDR video signal that has undergone the grayscale compression process of the reference signal interface) into a state in which the grayscale compression process of the other signal interface has been performed. That is, the output unit performs the grayscale decompression process corresponding to the grayscale compression process of the reference signal interface and the grayscale compression process of the other signal interface on the predetermined HDR video signal. Furthermore, the output unit performs at least a process of adding characteristics of system gamma of the reference signal interface to the predetermined HDR video signal.

In the present technology described above, the plurality of input apparatuses of the input unit input an HDR video signal that has undergone the grayscale compression process of the reference signal interface, and a predetermined HDR video signal extracted by the extraction unit turns into an HDR video signal that has undergone the grayscale compression process of the reference signal interface at all times. Thus, video adjustment of the plurality of input apparatuses can be uniformly performed in monitoring of the monitor compatible with the reference signal interface.

In addition, in the present technology, when an HDR video signal that has undergone a grayscale compression process of another signal interface is to be output, the output unit performs at least the process of adding characteristics of system gamma of the reference signal interface. Thus, in a case in which the HDR video signal that has undergone the grayscale compression process of the other signal interface is monitored on a monitor compatible with the interface, the video can be made identical to a video (adjusted video) appearing in a case in which the above-described predetermined HDR video signal is monitored on a monitor compatible with the reference signal interface.

Note that, in the present technology, for example, the input unit may include a camera system, and the camera system may have an imaging unit that obtains a linear HDR video signal, and a processing unit that processes the linear HDR video signal and obtains an HDR video signal that has undergone the grayscale compression process of the reference signal interface.

In addition, in the present technology, for example, the input unit may include a signal conversion unit that converts the HDR video signal that has undergone the grayscale compression process of the other signal interface other than the reference signal interface into the HDR video signal that has undergone the grayscale compression process of the reference signal interface, and the signal conversion unit may perform at least each process of the grayscale decompression process corresponding to the grayscale compression process of the other signal interface, a process of adding a characteristic that cancels out the characteristics of system gamma of the reference signal interface, and the grayscale compression process of the reference signal interface on the HDR video signal that has undergone the grayscale compression process of the other signal interface.

In this case, in a case in which the HDR video signal that has undergone the grayscale compression process of the reference signal interface obtained by the signal conversion unit is monitored on a monitor compatible with the interface, the video can be made identical to a video appearing in a case in which an HDR video signal that has undergone a grayscale compression process of another signal interface is monitored on a monitor compatible with the interface.

In addition, in the present technology, for example, the output unit may be further able to output a standard dynamic range (SDR) video signal. In this case, for example, information of a predetermined HDR video signal and information of an SDR video signal produced on the basis of the predetermined HDR video signal are added to the predetermined HDR video signal, and when the output unit outputs the SDR video signal, the predetermined HDR video signal may be processed on the basis of the information added to the predetermined HDR video signal and thereby the SDR video signal may be obtained.

Advantageous Effects of Invention

According to the present technology, HDR video signals of a plurality of signal interfaces can be satisfactorily handled. Note that, effects described in the present specification are merely illustrative and not limitative, and additional effects may be exhibited.

BRIEF DESCRIPTION OF DRAWINGS

FIG. 14 is a block diagram illustrating configuration examples of HDR converters.

FIG. 17 is a block diagram illustrating a configuration example of an HDR converter.

FIG. 18 is a block diagram illustrating a configuration example of an HDR converter.

FIG. 22 is a diagram illustrating representative examples of actual set values of the OETF conversion unit.

MODE(S) FOR CARRYING OUT THE INVENTION

Embodiments for implementing the invention (which will also be referred to as embodiments) will be described below. Note that description will be provided in the following order.
1. First Embodiment
2. Second Embodiment
3. Third Embodiment
4. Fourth Embodiment
5. Fifth Embodiment
6. Modified examples

1. FIRST EMBODIMENT

[Configuration Example of Camera System]

Figure 1:
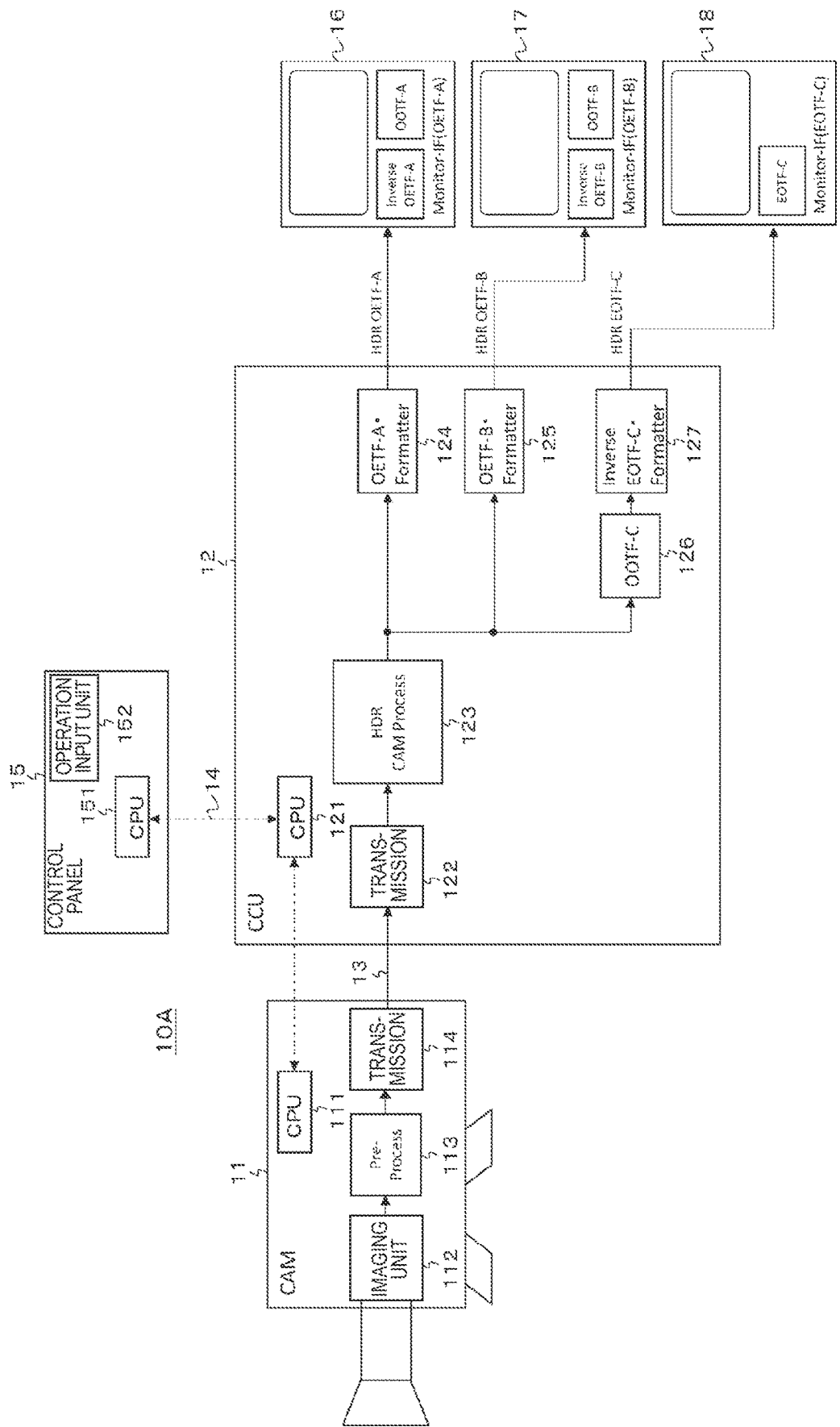
FIG. 1 is a block diagram illustrating a configuration example of a camera system as a first embodiment.

FIG. 1 illustrates a configuration example of a camera system 10A as a first embodiment. The camera system 10A is configured such that a linear high dynamic range (HDR) video signal obtained by a camera 11 is transmitted to a Camera Control Unit (CCU) 12 serving as a signal processing unit. Here, being linear means that a grayscale compression processing is not performed. The camera 11 and the CCU 12 are connected through a camera cable 13 including optical fibers and the like.

The camera 11 has a CPU 111, an imaging unit 112, a pre-processing unit 113, and a transmission unit 114. The CPU 111 controls operations of each of the units of the camera 11 and further communicates with a CPU 121 of the CCU 12 through the camera cable 13. The imaging unit 112 has an image sensor with, for example, a UHD (8K, 4K, etc.) or HD resolution, and outputs an HDR video signal as a captured video signal.

Here, 4K resolution is a resolution with about 4000 pixels horizontally about 2000 pixels vertically, for example, 4096×2160 or 3840×2160, and 8K resolution is a resolution in which there are twice as many pixels both vertically and horizontally as in 4K resolution. In addition, an HD resolution is, for example, a resolution in which there half as many pixels vertically and horizontally as in 4K resolution.

The pre-processing unit 113 is a processor including a circuit, for example, a field-programmable gate array (an FPGA), an application specific integrated circuit (an ASIC), or the like, and performs a correction process of an optical system such as lenses, a correction process caused by a variation of image sensors, or the like with respect to HDR video signals output from the imaging unit 112. The transmission unit 114 is a circuit having a communication interface and transmits HDR video signals processed by the pre-processing unit 113 to the CCU 12.

The CCU 12 has the CPU 121, a transmission unit 122, an HDR camera processing (HDR-CAM processing) unit 123, an OETF-A•formatter unit 124, an OETF-B•formatter unit 125, an OOTF-C unit 126, and an inverse EOTF-C-formatter unit 127. The CPU 121 controls operations of each of the units of the CCU 12, further communicates with the CPU 111 of the camera 11 through the camera cable 13, and communicates with a CPU 151 of a control panel 15 connected thereto via a communication path 14 of a local area network (LAN) or the like.

The control panel 15 has an operation input unit 152 in addition to the CPU 151. The CPU 151 receives various control commands and setting information input by a producer such as a video engineer (VE) using the operation input unit 152 and transmits the commands and information to the CPU 121 of the CCU 12 via the communication path 14.

The transmission unit 122 is a circuit having a communication interface, and receives a linear HDR video signal transmitted from the camera 11. The HDR camera processing unit 123 is a processor including a circuit, for example, an FPGA, an ASIC, or the like, and performs a process such as color gamut conversion or detail (contour) correction on the linear HDR video signal received by the transmission unit 122.

Figure 2:
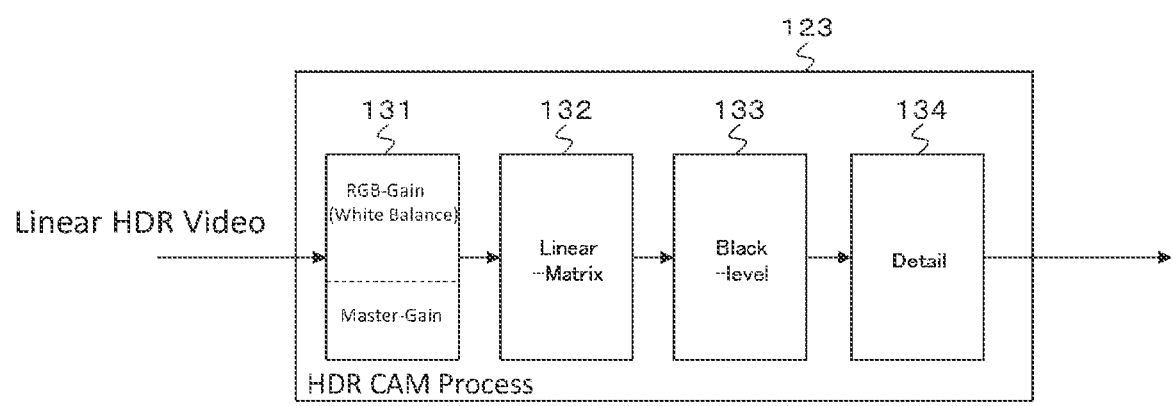
FIG. 2 is a diagram illustrating a detailed configuration example of an HDR camera processing unit.

FIG. 2 illustrates a detailed configuration example of the HDR camera processing unit 123. The HDR camera processing unit 123 has an HDR gain adjustment unit 131, a linear-matrix unit 132, a black-level unit 133, and a detail unit 134.

The HDR gain adjustment unit 131 controls a master gain with respect to the linear HDR video signal received by the transmission unit 122 (see FIG. 1) and a gain of signals of each of the primary colors R, G, and B for white balance adjustment. The linear-matrix unit 132 performs a process of color gamut conversion on the HDR video signal output from the HDR gain adjustment unit 131.

The black-level unit 133 adjusts a black level of the HDR video signal output from the linear-matrix unit 132. The detail unit 134 performs a process of detail (contour) correction on the HDR video signal output from the black-level unit 133. The HDR video signal output from the detail unit 134 is an output of the HDR camera processing unit 123.

Returning to FIG. 1, the OETF-A•formatter unit 124 is a processor including a circuit, for example, an FPGA, an ASIC, or the like, and performs a grayscale compression process of a signal interface A on the linear HDR video signal output from the HDR camera processing unit 123. The grayscale compression process refers to a process of compressing a bit length from a linear area using an opto-electrical transfer function (OETF) for the signal interface A. The signal interface A is, for example, "S-Log 3." In addition, the OETF-A•formatter unit 124 converts the grayscale-compressed HDR video signal from the RGB domain into the Y color difference domain, and obtains an HDR video signal "HDR OETF-A" that has undergone the grayscale compression process of the signal interface A.

The HDR video signal "HDR OETF-A" obtained by the OETF-A•formatter unit 124 of the CCU 12 as described above can be monitored on a monitor 16 corresponding to the signal interface A. The monitor 16 has an inverse OETF-A unit and an OOTF-A unit. The inverse OETF-A unit performs a grayscale decompression process corresponding to the grayscale compression process of the signal interface A on the HDR video signal "HDR OETF-A." The grayscale decompression process mentioned here is performed using inverse characteristics of the opto-electrical transfer function (OETF) for the signal interface A. In addition, the OOTF-A unit adds characteristics of system gamma of the signal interface A to the HDR video signal "HDR OETF-A." Accordingly, a video displayed on the monitor 16 is corrected using the characteristics of the system gamma of the signal interface A.

the OETF-B•formatter unit 125 is a processor including a circuit, for example, an FPGA, an ASIC, or the like, and performs a grayscale compression process of a signal interface B on the linear HDR video signal output from the HDR camera processing unit 123. The grayscale compression process refers to a process of compressing a bit length from a linear area using an opto-electrical transfer function (OETF) for the signal interface B. The signal interface B is, for example, "Hybrid Log-Gamma (HLG)." In addition, the OETF-B•formatter unit 125 converts the grayscale-compressed HDR video signal from the RGB domain into the Y color difference domain, and obtains an HDR video signal "HDR OETF-B" that has undergone the grayscale compression process of the signal interface B.

The HDR video signal "HDR OETF-B" obtained by the OETF-B•formatter unit 125 of the CCU 12 as described above can be monitored on a monitor 17 corresponding to the signal interface B. The monitor 17 has an inverse OETF-B unit and an OOTF-B unit. The inverse OETF-B unit performs a grayscale decompression process corresponding to the grayscale compression process of the signal interface B on the HDR video signal "HDR OETF-B." The grayscale decompression process mentioned here is performed using inverse characteristics of the opto-electrical transfer function (OETF) for the signal interface B. In addition, the OOTF-B unit adds characteristics of system gamma of the signal interface B to the HDR video signal "HDR OETF-B." Accordingly, a video displayed on the monitor 17 is corrected using the characteristics of the system gamma of the signal interface B.

The OOTF-C unit 126 is a processor including a circuit, for example, an FPGA, an ASIC, or the like, and adds characteristics of system gamma (opto-optical transfer function or OOTF) of a signal interface C to the linear HDR video signal output from HDR camera processing unit 123.

The inverse EOTF-C-formatter unit 127 is a processor including a circuit, for example, an FPGA, an ASIC, or the like, and performs the grayscale compression process of the signal interface C on the HDR video signal output from the OOTF-C unit 126. The grayscale compression process mentioned here refers to a process of compressing a bit length from a linear area using inverse characteristics of an electro-optical transfer function (EOTF) for the signal interface C. The signal interface C is, for example, a "Perceptual Quantizer (PQ)." In addition, the inverse EOTF-C-formatter unit 127 converts the grayscale-compressed HDR video signal from the RGB domain into the Y color difference domain and obtains an HDR video signal "HDR EOTF-C" that has undergone the grayscale compression process of the signal interface C.

The HDR video signal "HDR EOTF-C" obtained by the OETF-C-formatter unit 127 of the CCU 12 as described above can be monitored by a monitor 18 corresponding to the signal interface C. The monitor 18 has an EOTF-C unit. The EOTF-C unit performs the grayscale decompression process corresponding to the grayscale compression process of the signal interface C on the HDR video signal "HDR EOTF-C." The grayscale decompression process mentioned here is performed using an electro-optical transfer function (EOTF) for the signal interface C. Accordingly, a video displayed on the monitor 18 is corrected using characteristics of system gamma of the signal interface C.

As described above, the CCU 12 of the camera system 10A illustrated in FIG. 1 obtains the HDR video signals that have undergone the grayscale compression processes of the signal interfaces A, B, and C. Thus, a camera system with improved usability can be provided.

Note that, although the HDR video signals that have undergone the grayscale compression processes of the signal interfaces A, B, and C are simultaneously output from the CCU 12 in the camera system 10A illustrated in FIG. 1, a configuration in which one of the HDR video signals is selectively output can also be adopted. In this case, for example, a processor (a processing unit) can be disposed subsequent to the HDR camera processing unit 123 and selectively switch between "the OETF-A•formatter unit 124," "the OETF-B•formatter unit 125," or the "the OOTF-C unit 126 and the inverse EOTF-C-formatter unit 127" to give the output function and thereby a decrease in a circuit size can also be achieved.

2. SECOND EMBODIMENT

[Configuration Example of Camera System]

Figure 3:
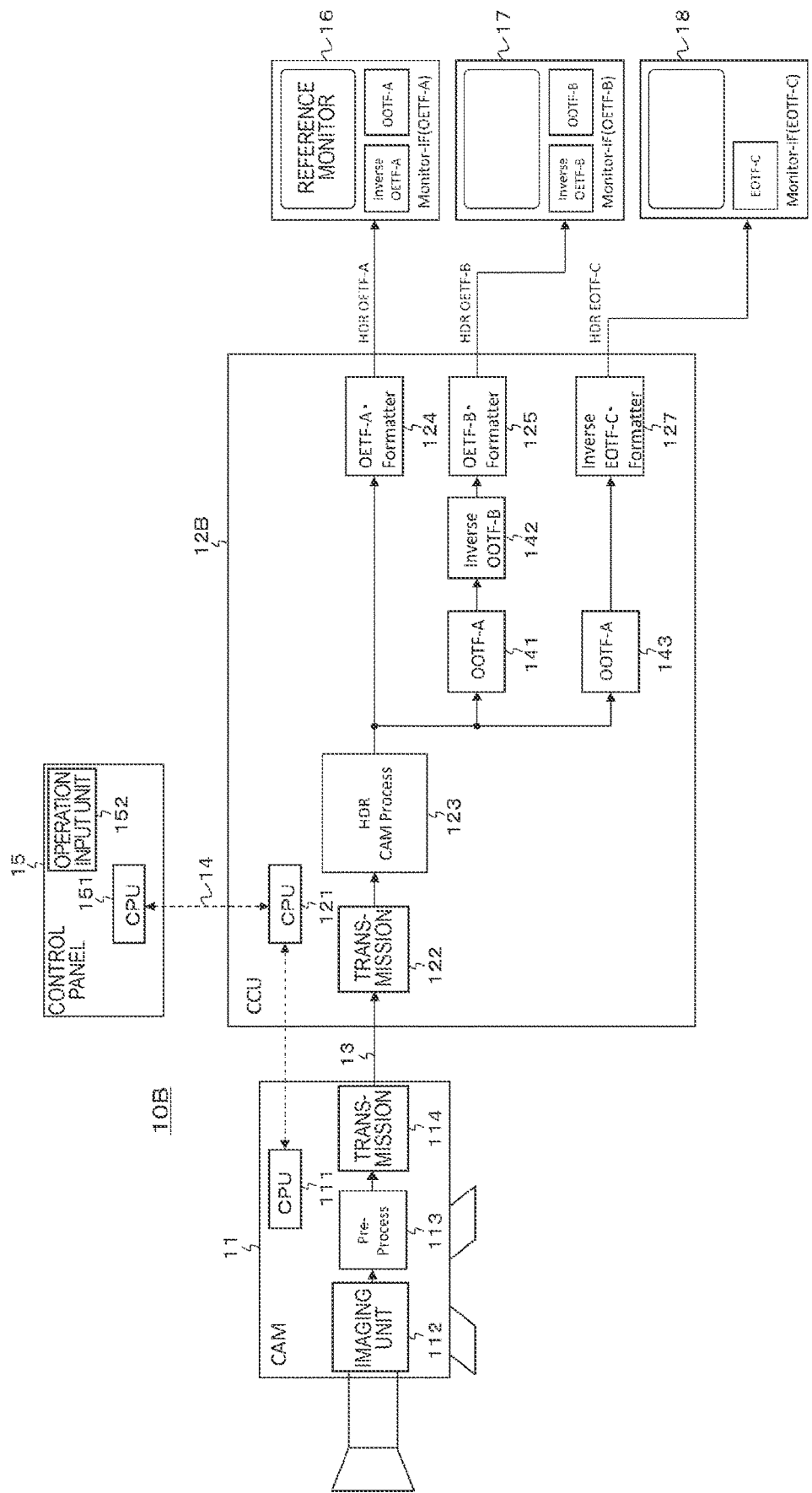
FIG. 3 is a block diagram illustrating a configuration example of a camera system as a second embodiment.

FIG. 3 illustrates a configuration example of a camera system 10B as a second embodiment. In FIG. 3, the same reference numerals are given to parts corresponding to those of FIG. 1, and detailed description thereof will be appropriately omitted. The camera system 10B has a configuration in which a linear HDR video signal obtained by a camera 11 is transmitted to a camera control unit (CCU) 12B serving as a signal processing unit.

The CCU 12B has the CPU 121, a transmission unit 122, an HDR camera processing unit 123, an OETF-A•formatter unit 124, an OETF-B•formatter unit 125, an inverse EOTF-C-formatter unit 127, OOTF-A units 141 and 143, and an inverse OOTF-B unit 142. The CPU 121 controls operations of each of the units of the CCU 12B, further communicates with the CPU 111 of the camera 11 through the camera cable 13, and communicates with a CPU 151 of a control panel 15 connected thereto via a communication path 14 of a LAN or the like.

The transmission unit 122 is a circuit having a communication interface, and receives a linear HDR video signal transmitted from the camera 11. The HDR camera processing unit 123 performs a process such as color gamut conversion or detail (contour) correction on the linear HDR video signal received by the transmission unit 122.

The OETF-A•formatter unit 124 performs a grayscale compression process of the signal interface A on the linear HDR video signal output from the HDR camera processing unit 123. The grayscale compression process mentioned here refers to a process of compressing a bit length from a linear area using the opto-electrical transfer function (OETF) for the signal interface A. In addition, the OETF-A•formatter unit 124 converts the grayscale-compressed HDR video signal from the RGB domain to the Y color difference domain and obtains an HDR video signal "HDR OETF-A" that has undergone the grayscale compression process of the signal interface A.

The HDR video signal "HDR OETF-A" obtained by the OETF-A•formatter unit 124 of the CCU 12B as described above can be monitored by a monitor 16 corresponding to the signal interface A. The monitor 16 has an inverse OETF-A unit and an OOTF-A unit. Accordingly, a video displayed on the monitor 16 is corrected with characteristics of system gamma of the signal interface A.

The OOTF-A unit 141 is a processor including a circuit, for example, an FPGA, an ASIC, or the like, and adds characteristics of the system gamma (OOTF) of the signal interface A to the linear HDR video signal output from the HDR camera processing unit 123. The inverse OOTF-B unit 142 is a processor including a circuit, for example, an FPGA, an ASIC, or the like, and adds characteristics that cancel out the characteristics of system gamma (OOTF) of the signal interface B on the HDR video signal output from the OOTF-A unit 141.

The OETF-B•formatter unit 125 performs the grayscale compression process of the signal interface B on the HDR video signal output from the inverse OOTF-B unit 142. The grayscale compression process mentioned here refers to a process of compressing a bit length from a linear area using the opto-electrical transfer function (EOTF) for the signal interface B. In addition, the OETF-B•formatter unit 125 converts the grayscale-compressed HDR video signal from the RGB domain to the Y color difference domain and thereby obtains an HDR video signal "HDR OETF-B" that has undergone the grayscale compression process of the signal interface B.

The HDR video signal "HDR OETF-B" obtained by the OETF-B•formatter unit 125 of the CCU 12B as described above can be monitored by the monitor 17 corresponding to the signal interface B. The monitor 17 has an inverse OETF-B unit and an OOTF-B unit. Since the OOTF-A unit 141 and the inverse OOTF-B unit 142 are present in the system of the HDR video signal "HDR OETF-B" of the CCU 12B as described above, a video displayed on the monitor 17 is corrected using the characteristics of the system gamma of the signal interface A, like the video displayed on the above-described monitor 16.

The OOTF-A unit 143 is a processor including a circuit, for example, an FPGA, an ASIC, or the like, and adds characteristics of the system gamma (OOTF) of the signal interface A to the linear HDR video signal output from the HDR camera processing unit 123.

The inverse EOTF-C-formatter unit 127 performs a grayscale compression process of the signal interface C on the HDR video signal output from the OOTF-A unit 143. The grayscale compression process mentioned here refers to a process of compressing a bit length from a linear area using inverse characteristics of the electro-optical transfer function (EOTF) of the signal interface C. In addition, the inverse EOTF-C-formatter unit 127 converts the grayscale-compressed HDR video signal from the RGB domain to the Y color difference domain and then obtains an HDR video signal "HDR EOTF-C" that has undergone the grayscale compression process of the signal interface C. In terms of signal interface, OOTF-C should be added, however, OOTF-A includes OOTF-C, and it can be regarded that signal processing with [OOTF-A-OOTF-C] has been performed as video correction, and thereby, it can be said that the signal interface of EOTF-C is complied.

The HDR video signal "HDR EOTF-C" obtained by the inverse OETF-C-formatter unit 127 of the CCU 12B can be monitored on a monitor 18 corresponding to the signal interface C. The monitor 18 has an EOTF-C unit. Since the above-described OOTF-A unit 141 is present and the OOTF-C unit 126 (see FIG. 1) is not present in the system of the HDR video signal "HDR OETF-C" of the CCU 12B, a video displayed on the monitor 18 is corrected using the characteristics of the system gamma of the signal interface A, like the video displayed on the above-described monitor 16.

Having the signal interface A as a reference signal interface in the camera system 10B illustrated in FIG. 3, when the grayscale compression process of another signal interface other than the reference signal interface is performed in the CCU 12B as described above, the process of adding the characteristics of the system gamma of the reference signal interface and the process of cancelling out the characteristics of system gamma of the other signal interface are performed.

In this case, in a case in which an HDR video signal that has undergone a grayscale compression process of another signal interface is monitored on a monitor compatible with the interface, the video is made identical to a video appearing in a case in which an HDR video signal that has undergone the grayscale compression process of the reference signal interface is monitored on a monitor compatible with the interface (reference monitor). Thus, even in a case in which an HDR video signal that has undergone a grayscale compression process of another signal interface other than the reference signal interface is to be output, camera adjustment (video adjustment) can be performed on the basis of a video on the reference monitor.

Note that, although the HDR video signals that have undergone the grayscale compression processes of the signal interfaces A, B, and C are simultaneously output from the CCU 12B in the camera system 10B illustrated in FIG. 3, a configuration in which one of the HDR video signals is selectively output can also be adopted. In this case, for example, a processor (a processing unit) can be disposed subsequent to the HDR camera processing unit 123 and selectively switch between "the OETF-A•formatter unit 124," "the OOTF-A unit 141, the inverse OOTF-B unit 142, and the OETF-B•formatter unit 125," or the "the OOTF-A unit 143 and the inverse EOTF-C-formatter unit 127" to give the output function and thereby a decrease in a circuit size can also be achieved.

3. THIRD EMBODIMENT

[Configuration Example of Camera System]

Figure 4:
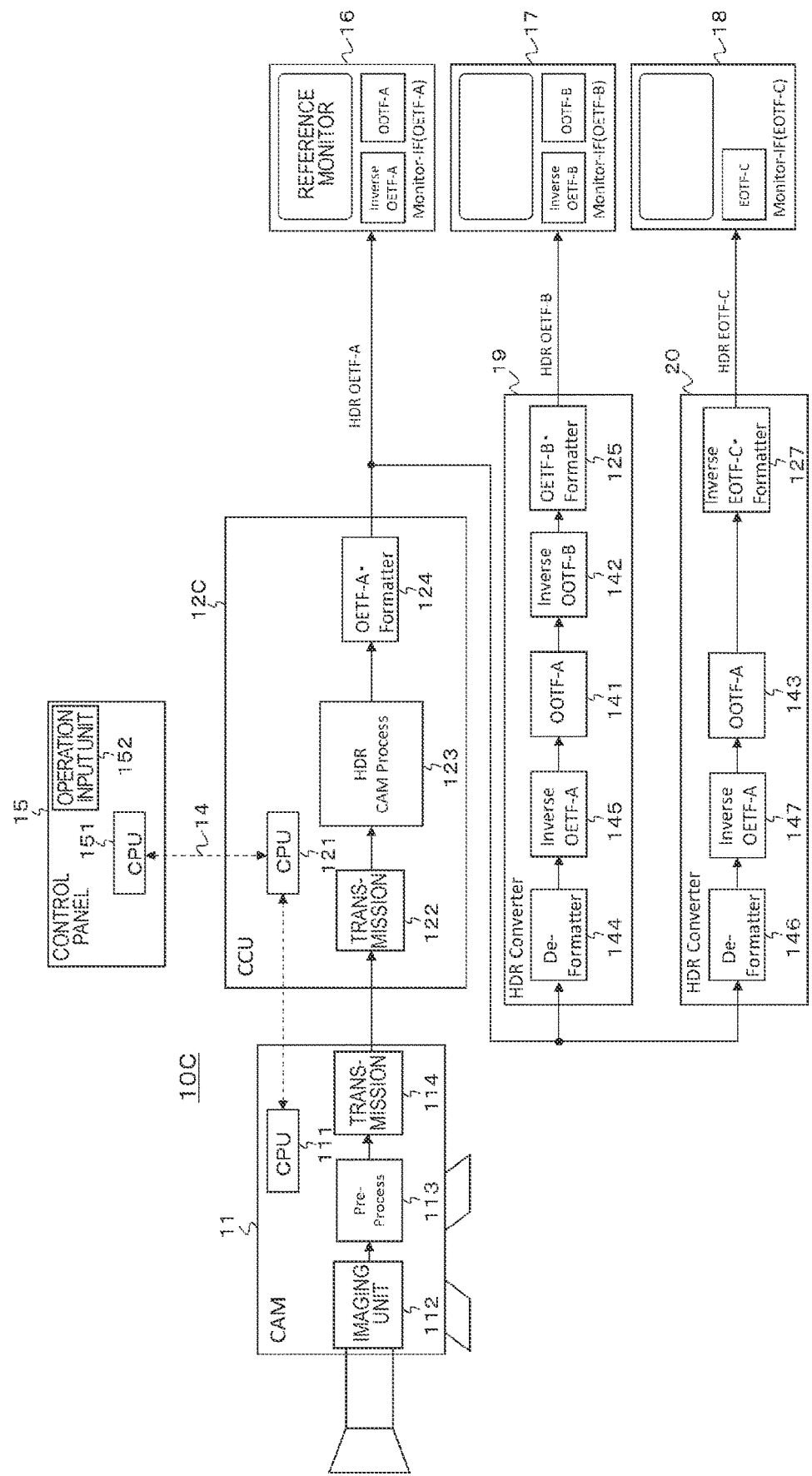
FIG. 4 is a block diagram illustrating a configuration example of a camera system as a third embodiment.

FIG. 4 illustrates a configuration example of a camera system 10C as a third embodiment. In FIG. 4, the same reference numerals are given to parts corresponding to those of FIGS. 1 and 3, and detailed description thereof will be appropriately omitted. The camera system 10C has a configuration in which a linear HDR video signal obtained by a camera 11 is transmitted to a camera control unit (CCU) 12C serving as a signal processing unit.

In addition, the camera system 10C performs a signal conversion process on the HDR video signal that has undergone the grayscale compression process of the signal interface A output from the CCU 12C using HDR converters (HDR-Converter) 19 and 20 and the converters respectively obtain HDR video signals that have undergone the grayscale compression process of the signal interfaces B and C.

The CCU 12C has the CPU 121, a transmission unit 122, an HDR camera processing unit 123, and an OETF-A•formatter unit 124. The CPU 121 controls operations of each of the units of the CCU 12C, further communicates with the CPU 111 of the camera 11 through the camera cable 13, and communicates with a CPU 151 of a control panel 15 connected thereto via a communication path 14 of a LAN or the like.

The transmission unit 122 is a circuit having a communication interface, and receives a linear HDR video signal transmitted from the camera 11. The HDR camera processing unit 123 performs a process such as color gamut conversion or detail (contour) correction on the linear HDR video signal received by the transmission unit 122.

The OETF-A•formatter unit 124 performs a grayscale compression process of the signal interface A on the linear HDR video signal output from the HDR camera processing unit 123. The grayscale compression process mentioned here refers to a process of compressing a bit length from a linear area using the opto-electrical transfer function (OETF) for the signal interface A. In addition, the OETF-A•formatter unit 124 converts the grayscale-compressed HDR video signal from the RGB domain to the Y color difference domain and obtains an HDR video signal "HDR OETF-A" that has undergone the grayscale compression process of the signal interface A.

The HDR video signal "HDR OETF-A" obtained by the OETF-A•formatter unit 124 of the CCU 12C as described above can be monitored by a monitor 16 corresponding to the signal interface A. The monitor 16 has an inverse OETF-A unit and an OOTF-A unit. Accordingly, a video displayed on the monitor 16 is corrected with characteristics of system gamma of the signal interface A.

The HDR converter 19 is a processor including a circuit, for example, an FPGA, an ASIC, or the like, and has a de-formatter unit 144, an inverse OETF-A unit 145, an OOTF-A unit 141, an inverse OOTF-B unit 142, and an OETF-B•formatter unit 125.

The de-formatter unit 144 performs a conversion process on the HDR video signal "HDR OETF-A" that has undergone the grayscale compression process of the signal interface A output from the CCU 12C from the Y color difference domain to the RGB domain. The inverse OETF-A unit 145 performs a grayscale decompression process corresponding to the grayscale compression process of the signal interface A on the HDR video signal output from the de-formatter unit 144. The grayscale decompression process mentioned here is performed using inverse characteristics of the opto-electrical transfer function (OETF) for the signal interface A.

The OOTF-A unit 141 adds characteristics of the system gamma (OOTF) of the signal interface A to the linear HDR video signal output from the inverse OETF-A unit 145. The inverse OOTF-B unit 142 adds characteristics that cancel out characteristics of system gamma (OOTF) of the signal interface B to the HDR video signal output from the OOTF-A unit 141.

The OETF-B•formatter unit 125 performs the grayscale compression process of the signal interface B on the HDR video signal output from the inverse OOTF-B unit 142. The grayscale compression process mentioned here refers to a process of compressing a bit length from a linear area using the opto-electrical transfer function (OETF) for the signal interface B. In addition, the OETF-B•formatter unit 125 converts the grayscale-compressed HDR video signal from the RGB domain to the Y color difference domain and thereby obtains an HDR video signal "HDR OETF-B" that has undergone the grayscale compression process of the signal interface B.

The HDR video signal "HDR OETF-B" obtained by the HDR converter 19 as described above can be monitored by the monitor 17 corresponding to the signal interface B. The monitor 17 has an inverse OETF-B unit and an OOTF-B unit. Since the OOTF-A unit 141 and the inverse OOTF-B unit 142 are present in the system of the HDR converter 19 as described above, a video displayed on the monitor 17 is corrected using the characteristics of the system gamma of the signal interface A, like the video displayed on the above-described monitor 16.

The HDR converter 20 is a processor including a circuit, for example, an FPGA, an ASIC, or the like, and has a de-formatter unit 146, an inverse OETF-A unit 147, an OOTF-A unit 143, and an inverse EOTF-C-formatter unit 127. The de-formatter unit 146 performs a conversion process on the HDR video signal "HDR OETF-A" that has undergone the grayscale compression process of the signal interface A output from the CCU 12C from the Y color difference domain to the RGB domain.

The inverse OETF-A unit 147 performs the grayscale decompression process corresponding to the grayscale compression process of the signal interface A on the HDR video signal output from the de-formatter unit 146. The grayscale decompression process mentioned here is performed using inverse characteristics of the opto-electrical transfer function (OETF) for the signal interface A. The OOTF-A unit 143 adds the characteristics of the system gamma (OOTF) of the signal interface A on the linear HDR video signal output from the inverse OETF-A unit 147.

The inverse EOTF-C-formatter unit 127 performs the grayscale compression process of the signal interface C on the HDR video signal output from the OOTF-A unit 143. The grayscale compression process mentioned here refers to a process of compressing a bit length from a linear area using inverse characteristics of the electro-optical transfer function (EOTF) for the signal interface C. In addition, the inverse EOTF-C-formatter unit 127 converts the grayscale-compressed HDR video signal from the RGB domain to the Y color difference domain, and thereby obtains an HDR video signal "HDR EOTF-C" that has undergone the grayscale compression process of the signal interface C.

The HDR-C video signal "HDR EOTF-C" obtained by the HDR converter 20 as described above can be monitored on a monitor 18 corresponding to the signal interface C. The monitor 18 has an EOTF-C unit. Since the OOTF-A unit 141 is present and the OOTF-C unit 126 (see FIG. 1) is not present in the system of the HDR converter 20 as described above, a video displayed on the monitor 18 is corrected using the characteristics of the system gamma of the signal interface A, like the video displayed on the above-described monitor 16.

Having the signal interface A as a reference signal interface in the camera system 10C illustrated in FIG. 4, when the grayscale compression process of another signal interface other than the reference signal interface is performed in the HDR converters 19 and 20 as described above, the process of adding the characteristics of the system gamma of the reference signal interface and the process of cancelling out the characteristics of system gamma of the other signal interface are performed.

In this case, in a case in which an HDR video signal that has undergone a grayscale compression process of another signal interface is monitored on a monitor compatible with the interface, the video is made identical to a video appearing in a case in which an HDR video signal that has undergone the grayscale compression process of the reference signal interface is monitored on a monitor compatible with the interface (reference monitor). Thus, even in a case in which an HDR video signal that has undergone a grayscale compression process of another signal interface other than the reference signal interface is to be output, camera adjustment (video adjustment) can be performed on the basis of a video on the reference monitor.

4. FOURTH EMBODIMENT

[Configuration Example of Video System]

Figure 5:
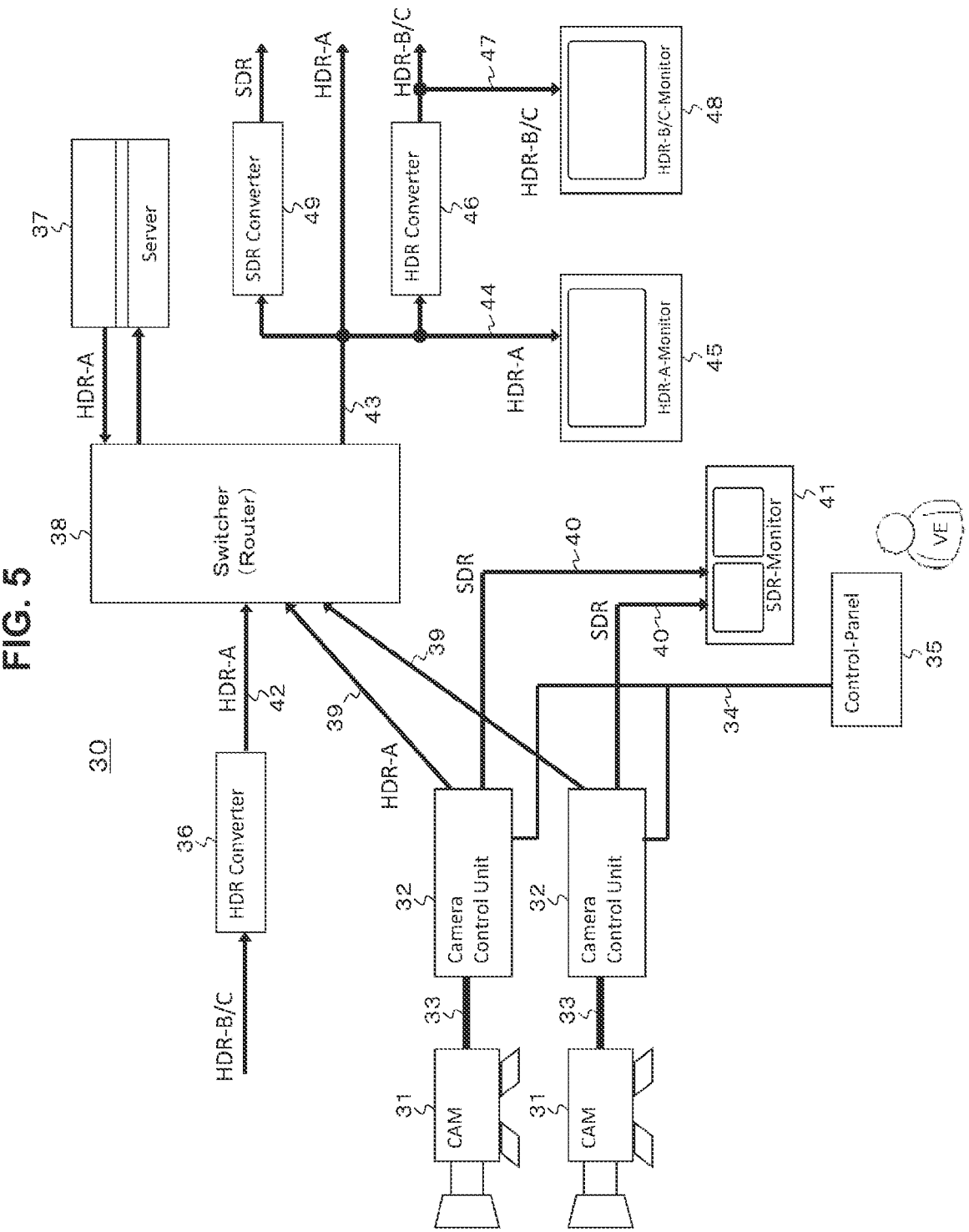
FIG. 5 is a block diagram illustrating a configuration example of a video system as a fourth embodiment.

FIG. 5 illustrates a configuration example of a video system 30 as a fourth embodiment. The video system 30 has a predetermined number of camera systems each including a camera 31 and a camera control unit (CCU) 32, of which there are 2 in the illustrated example. The camera 31 and the CCU 32 are connected by a camera cable 33.

A control panel 35 is connected to the CCU 32 via a communication path 34 of a LAN or the like. A high dynamic range (HDR) video signal (HDR-A video signal) that has undergone the grayscale compression process of the signal interface A and a standard dynamic range (SDR) video signal are output from the CCU 32. In this embodiment, the signal interface A is set as a reference signal interface (standard signal interface). The signal interface A is, for example, "S-Log 3."

In addition, the video system 30 has a predetermined number of HDR converters (HDR-Converter) 36 that convert an HDR signal that has undergone the grayscale compression process of a signal interface other than the signal interface A into an HDR signal (HDR-A video signal) that has undergone the grayscale compression process of the signal interface A, of which there is one in the illustrated example. The HDR converter 36 is a processor including a circuit, for example, an FPGA, an ASIC, or the like. The HDR converter 36 converts, for example, an HDR video signal (HDR-B video signal) that has undergone the grayscale compression process of the signal interface B or an HDR video signal (HDR-C video signal) that has undergone the grayscale compression process of the signal interface C into an HDR-A video signal. The signal interface B is, for example, an "HLG (Hybrid Log-Gamma)," and the signal interface C is "PQ (Perceptual Quantizer)."

In addition, the video system 30 has a server (Server) 37 that can perform recording and reproduction of HDR-A video signals. HDR-A video signals recorded in the server 37 also include an HDR-A video signal output from the CCU 32 and an HDR-A video signal output from the HDR converter 36. Here, the camera system, the HDR converter 36, the server 37, and the like are included in input apparatuses.

In addition, the video system 30 has a switcher (Switcher) 38. The HDR-A video signal output from the CCU 32 of the camera system is input to the switcher 38 via a transmission path 39. Here, the information of the HDR-A video signal and information of an SDR video signal are added to the HDR-A video signal output from the CCU 32 of the camera system. Note that the SDR video signal output from the CCU 32 of the camera system is supplied to an SDR monitor 41 via a transmission path 40 to be monitored.

In addition, the HDR-A video signal output from the HDR converter 36 is input to the switcher 38 via a transmission path 42. In addition, the HDR-A video signal reproduced from the server 37 is also input to the switcher 38. Note that an HDR-A signal to be recorded is supplied from the switcher 38 to the server 37.

The switcher 38 selectively extracts a predetermined HDR-A video signal from the HDR-A video signals input from the plurality of input apparatuses such as the camera system, the HDR converter 36, the server 37, and the like. The predetermined HDR-A video signal extracted by the switcher 38 is transmitted through a main transmission path 43. Note that the HDR-A video signal is supplied to a monitor 45 corresponding to the signal interface A via a transmission path 44 to be monitored.

In addition, the video system 30 has an HDR converter (HDR-Converter) 46 that converts the HDR-A video signal transmitted on the main transmission path 43 into an HDR signal that has undergone the grayscale compression process of a signal interface other than the signal interface A. The HDR converter 46 is a processor including a circuit, for example, an FPGA, an ASIC, or the like. The HDR converter 46 converts the HDR-A video signal into, for example, an HDR-B video signal or an HDR-C video signal. Note that the HDR video signal obtained by the HDR converter 46 is supplied to a monitor 48 for a corresponding signal interface via a transmission path 47 to be monitored.

In addition, the video system 30 has an SDR converter (SDR Converter) 49 that converts the HDR-A video signal transmitted on the main transmission path 43 into an SDR video signal. In a case in which information of the HDR-A video signal and information of an SDR video signal are added to the HDR-A video signal, the SDR converter 49 processes the HDR-A video signal on the basis of the information and obtains the SDR video signal.

Figure 6:
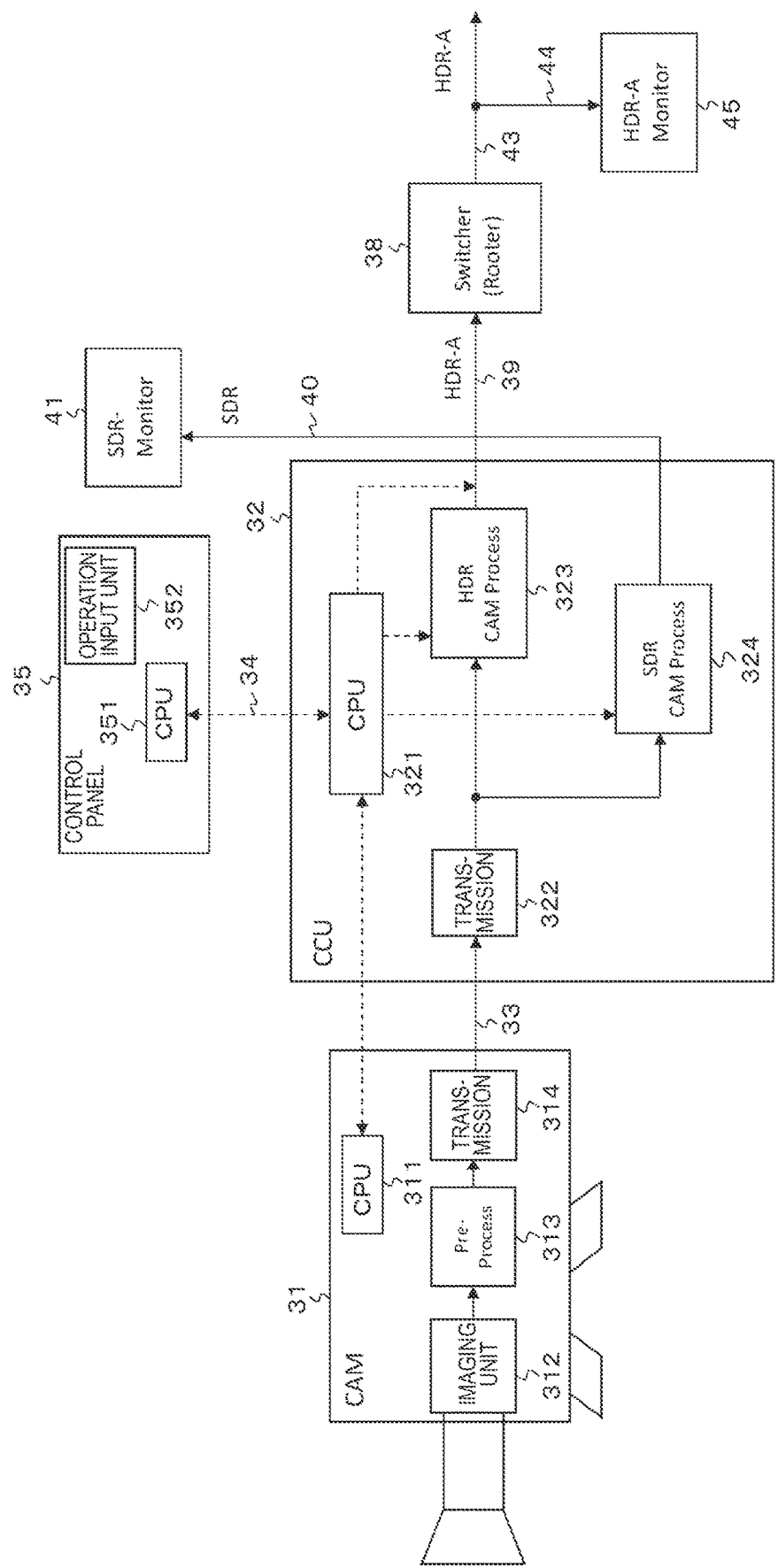
FIG. 6 is a block diagram illustrating a configuration example of a camera, a CCU, a control panel, and the like of the video system.

FIG. 6 illustrates a configuration example of the camera 31, the CCU 32, the control panel 35, and the like. The camera 31 has a CPU 311, an imaging unit 312, a pre-processing unit 313, and a transmission unit 314. The CPU 311 controls operations of each of the units of the camera 31 and further communicates with a CPU 321 of the CCU 32 through the camera cable 33. The imaging unit 312 has an image sensor with, for example, a UHD (8K, 4K, etc.) or HD resolution, and outputs an HDR video signal as a captured video signal.

The pre-processing unit 313 is a processor including a circuit, for example, a field-programmable gate array (an FPGA), an application specific integrated circuit (an ASIC), or the like, and performs a correction process of an optical system such as lenses, a flaw correction process caused by a variation of image sensors, or the like with respect to HDR video signals output from the imaging unit 312. The transmission unit 314 is a circuit having a communication interface and transmits HDR video signals processed by the pre-processing unit 313 to the CCU 32.

The CCU 32 has the CPU 321, a transmission unit 322, an HDR camera processing (HDR-CAM Process) unit 323, and an SDR camera processing (SDR CAM Process) unit 324. The CPU 321 controls operations of each of the units of the CCU 32, communicates with the CPU 311 of the camera 31 via a camera cable 33, and communicates with a CPU 351 of the control panel (Control Panel) 35 connected via a communication path 34 of a local area network (LAN), or the like.

The control panel 35 has an operation input unit 352 in addition to the CPU 351. The CPU 351 receives various control commands and setting information input by a producer such as a video engineer (VE) using the operation input unit 352 and transmits the commands and information to the CPU 321 of the CCU 32 via the communication path 34.

The transmission unit 322 is a circuit having a communication interface, and receives a linear HDR video signal transmitted from the camera 31. The HDR camera processing unit 323 is a processor including a circuit, for example, an FPGA, an ASIC, or the like, performs processes of color gamut conversion, detail (contour) correction, grayscale compression, and the like on the linear HDR video signal received by the transmission unit 322, then obtains an HDR video signal that has undergone the grayscale compression process of the signal interface A, that is, an HDR-A video signal "HDR OETF-A", and then transmits the signal to a transmission path 39. The grayscale compression process mentioned here refers to a process of compressing a bit length from a linear area using the opto-electrical transfer function (OETF) for the signal interface A.

The SDR camera processing unit 324 is a processor including a circuit, for example, an FPGA, an ASIC, or the like, obtains an SDR video signal by performing level (gain) conversion, color gamut conversion, knee correction, detail (contour) correction, gamma processing, and the like on the linear HDR video signal received by the transmission unit 322 and then transmits the signal to a transmission path 40.

Note that information of the HDR-A video signal "HDR OETF-A" obtained by the HDR camera processing unit 323 and information of the SDR video signal obtained by the SDR camera processing unit 324 are added to the HDR-A video signal under control of the CPU 321. Note that, as a method of adding information, the CPU 321 may perform a process of multiplexing information with an HDR video stream, or output the information as a metadata file as associated with an HDR data stream to the transmission path 39, separately from an HDR video.

Figure 7:
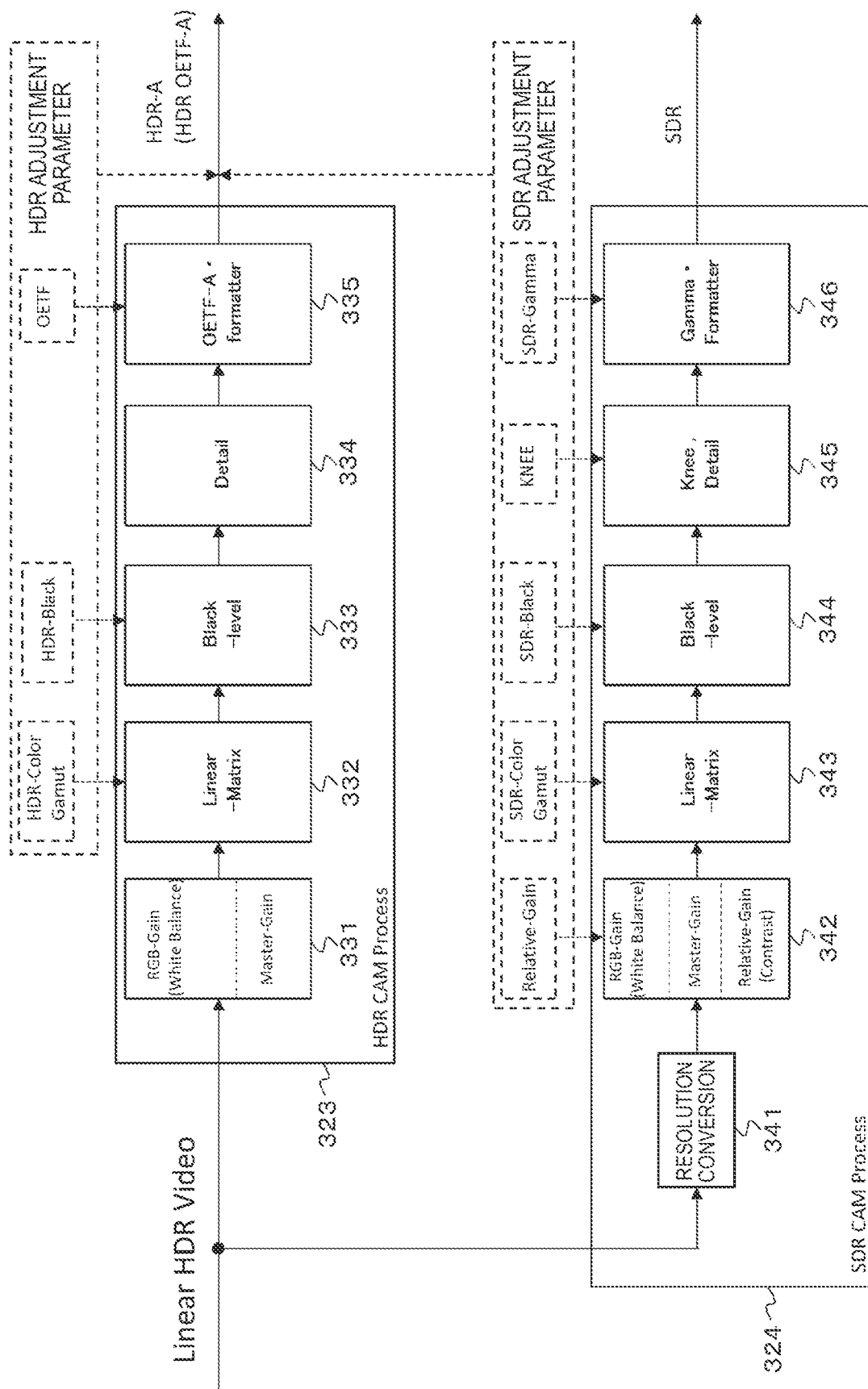
FIG. 7 is a block diagram illustrating a detailed configuration example of an HDR camera processing unit and an SDR camera processing unit constituting a CCU.

FIG. 7 illustrates a detailed configuration example of the HDR camera processing unit 323 and the SDR camera processing unit 324. Note that this example is an example in which an HDR video signal has a UHD (8K, 4K, etc.) resolution, and the SDR camera processing unit 324 may include a resolution conversion unit, which may convert the signal into an HD signal and output.

The HDR camera processing unit 323 has an HDR gain adjustment unit 331, a linear matrix (Linear-Matrix) unit 332, a black level (Black-level) unit 333, a detail (Detail) unit 334, and an OETF-A•formatter unit 335.

The HDR gain adjustment unit 331 controls a master gain of the linear HDR video signal (Linear HDR Video) received by the transmission unit 322 (see FIG. 6) and controls a gain of signals of each of the primary colors R, G, and B for adjusting white balance. The linear-matrix unit 332 performs a linear matrix process for color gamut conversion on the HDR video signal output from the HDR gain adjustment unit 331, if necessary. The processing details serve as HDR adjustment parameters as HDR-Color-Gamut information.

The black-level unit 333 adjusts a black level of the HDR video signal output from the linear-matrix unit 222 on the basis of information for black level correction (HDR-Black) that is part of the HDR adjustment parameter information. The detail unit 334 performs a process of detail (contour) correction on the HDR video signal output from the black-level unit 333.

The OETF-A•formatter unit 335 performs the grayscale compression process of the signal interface A on the HDR video signal output from the detail unit 334 on the basis of OETF information (OETF) that is part of the HDR adjustment parameter information. The grayscale compression process mentioned here refers to a process of compressing a bit length from a linear area using the opto-electrical transfer function (OETF) for the signal interface A. In addition, the OETF-A•formatter unit 335 converts the grayscale-compressed HDR video signal from the RGB domain to the Y color difference domain and thereby obtains an output HDR-A video signal "HDR OETF-A."

The CPU 321 adds, as information of the HDR-A video signal, for example, the HDR adjustment parameter information ("HDR-Color Gamut," "HDR-Black," and "OETF") to the HDR-A video signal "HDR OETF-A" and transmits the signal.

The SDR camera processing unit 324 has a resolution conversion unit 341, an SDR gain adjustment unit 342, a linear matrix (Linear-Matrix) unit 343, a black level (Black-level) unit 344, a knee (Knee)•detail (Detail) unit 345, and a gamma (Gamma)•formatter (Formatter) unit 346.

The resolution conversion unit 341 may convert the resolution of the linear HDR video signal (Linear HDR Video) received by the transmission unit 322 (see FIG. 6) from UHD to HD. The SDR gain adjustment unit 342 controls a master gain of the linear HDR video signal output from the resolution conversion unit 341 and controls a gain of signals of each of the primary colors R, G, and B for adjusting white balance on the basis of relative gain (Relative-Gain) information that is part of parameter information regarding levels of the SDR video and the HDR video.

The relative gain is a parameter indicating a ratio between a gain for pixel signals in the HDR process and a gain for pixel signals in the SDR process to make a contrast ratio between the HDR video and the SDR video adjustable. For example, a relative gain defines a setting of a multiple of a dynamic range of the HDR video with respect to a dynamic range of the SDR video.

With the relative gain, a ratio of a master gain on the SDR process side to a master gain on the HDR process side can be set to an arbitrary ratio, for example 1, ½, or the like. If a ratio of the master gain on the SDR process side to the master gain on the HDR process side is set, the dynamic range of the HDR video correlating to the dynamic range of the SDR video can be obtained.

More specifically, an upper limit reference of the dynamic range of the SDR video is given with reference white (Diffuse-White) chosen by a producer. By choosing the reference white (Diffuse-White) of the SDR video in the video system 30, a reference of the dynamic range of the HDR video (reference white (Diffuse-White) of the HDR video) is also determined on the basis of the correlation based on the relative gain.

The relative gain should be appropriately selected in accordance with a photographing environment, for example, daytime, night time, an indoor place, an outdoor place, inside a studio, in sunny weather, in rainy weather, or the like, and the texture of the video should be appropriately selected according to an intended production purpose. For this reason, the relative gain is provided as a variable that can handle various photographing environments. As a method for preparing the relative gain, a method of comparing a brightness of the appearance of the SDR video and the HDR video simultaneously output from the CCU 32 with that of the human eye can be conceived. The SDR video and the HDR video are compared each time a value of the relative gain is changed, and a relative gain close to the brightness of the appearance of the SDR video and the HDR video may be determined as an optimum relative gain for the photographing environment.

Note that the relative gain may be information for performing a white balance process or a contrast process for the SDR video, and for example, may be information other than a numerical value of a ratio of an HDR signal to a gain, such as a value of a gain for raw data that is a sensor output value.

Note that a luminance dynamic range of the HDR video is wider than a luminance dynamic range of the SDR video. As an example, when a luminance dynamic range of the SDR video is set to 0 to 100%, a luminance dynamic range of the HDR video is, for example, 0% to 1,300% or 0% to 10,000%.

The linear-matrix unit 343 performs a linear matrix process for color gamut conversion on the HDR video signal output from the SDR gain adjustment unit 342 on the basis of color gamut information (SDR-Color Gamut) that is part of SDR adjustment parameter information and information regarding colors of the SDR video. The black-level unit 344 adjusts a black level of the HDR video signal output from the linear-matrix unit 343 on the basis of information for black level correction (SDR-Black) that is part of the SDR adjustment parameter information. The knee-detail unit 345 performs knee correction on the HDR video signal output from the black-level unit 344 to convert the signal into an SDR video signal on the basis of information regarding knee correction (KNEE) that is part of the SDR adjustment parameter information, and further performs detail (contour) correction on the SDR video signal.

The gamma•formatter unit 346 performs gamma processing on the linear SDR video signal output from the knee-detail unit 345 on the basis of gamma characteristic information (SDR-Gamma) that is part of the SDR adjustment parameter information. In addition, the gamma•formatter unit 346 converts the signal-processed SDR video from the RGB domain to the Y color difference domain and thereby obtains an output SDR video signal.

The CPU 321 adds, as information of the SDR video signal, for example, SDR adjustment parameter information ("Relative-Gain," "SDR-Color Gamut," "SDR-Black," "KNEE," and "SDR-Gamma") to the HDR-A video signal "HDR OETF-A" and transmits the signal.

Figure 8:
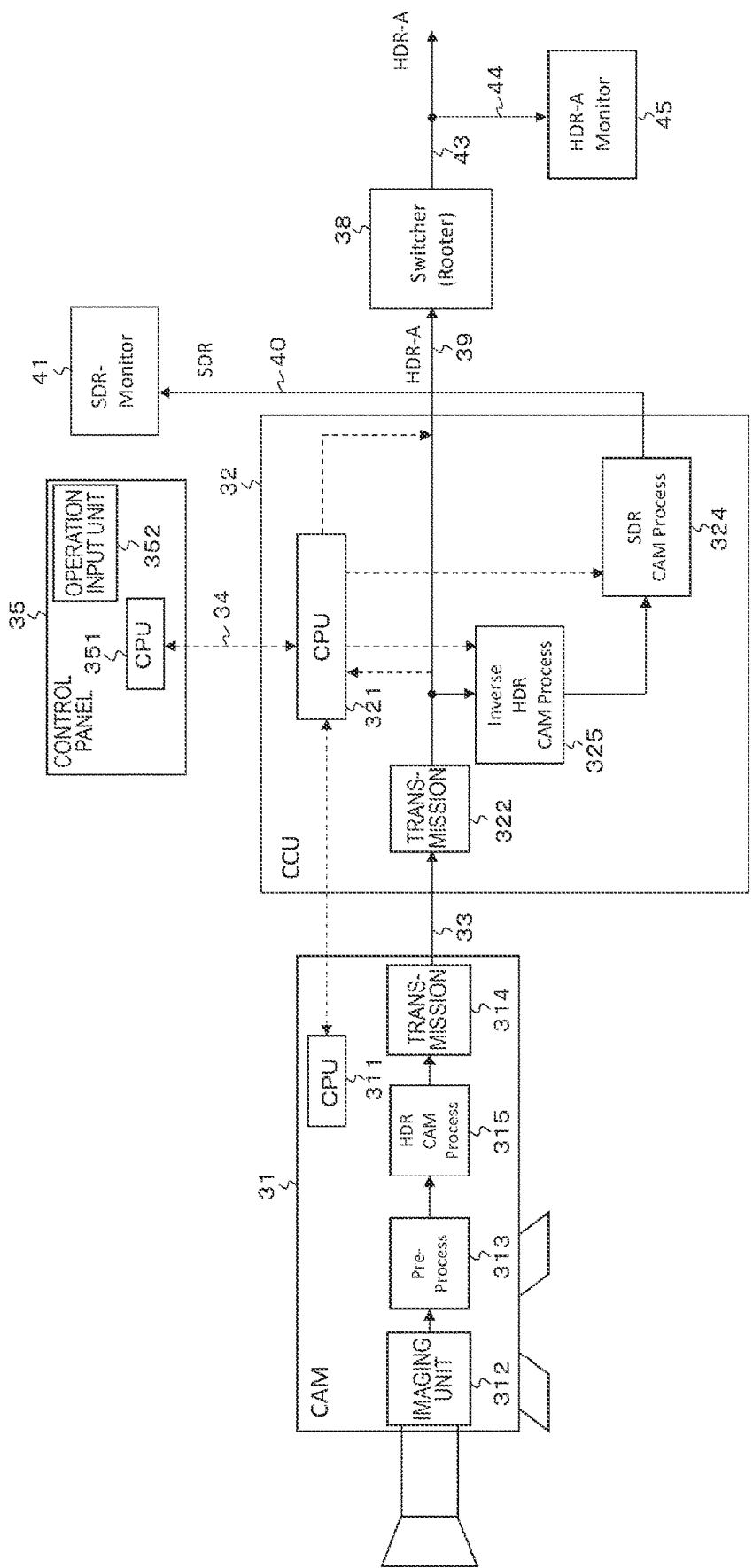
FIG. 8 is a block diagram illustrating another configuration example of a camera, a CCU, a control panel, and the like of the video system.

FIG. 8 illustrates another configuration example of the camera 31, the CCU 32, the control panel 35, and the like. In FIG. 8, the same reference numerals are given to parts corresponding to those of FIG. 6, and detailed description thereof will be appropriately omitted. The camera 31 has a CPU 311, an imaging unit 312, a pre-processing unit 313, an HDR camera processing (HDR-CAM Process) unit 315, and a transmission unit 314.

The HDR camera processing unit 315 is a processor including a circuit, for example, an FPGA, an ASIC, or the like, and performs a process of color gamut conversion, detail (contour) correction, grayscale compression, and the like on a linear HDR video signal processed by the pre-processing unit 313, and thereby obtains an HDR video signal that has undergone the grayscale compression process of the signal interface A, that is, an HDR-A video signal "HDR OETF-A." Although detailed description will be omitted, the HDR camera processing unit 315 has a similar configuration to the above-described HDR camera processing unit 323 (see FIGS. 6 and 7). The transmission unit 314 is a circuit having a communication interface, and transmits the HDR-A video signal "HDR OETF-A" obtained by the HDR camera processing unit 315 to the CCU 32.

Note that, information of the HDR-A video signal "HDR OETF-A" obtained by the HDR camera processing unit 315 is added to the HDR-A video signal under control of the CPU 311. This information is, for example, HDR adjustment parameter information ("HDR-Color Gamut," "HDR-Black," and "OETF"), like the information of the HDR-A video signal added to the HDR-A video signal "HDR OETF-A" obtained by the above-described HDR camera processing unit 323.

The CCU 32 has a CPU 321, a transmission unit 322, an inverse HDR camera processing (Inverse HDR-CAM Process) unit 325, and an SDR camera processing (SDR CAM Process) unit 324. The CPU 321 controls operations of each unit of the CCU 32, communicates with the CPU 311 of the camera 31 through a camera cable 33, and communicates with a CPU 351 of the control panel 35 connected via a communication path 34 of a LAN, or the like.

The transmission unit 322 is a circuit having a communication interface, and receives the HDR-A video signal "HDR OETF-A" transmitted from the camera 31 and outputs the signal to a transmission path 39. The HDR-A video signal "HDR OETF-A" includes the HDR adjustment parameter information ("HDR-Color Gamut," "HDR-Black," and "OETF"), for example, added thereto as information of the HDR-A video signal as described above.

The inverse HDR camera processing unit 325 is a processor including a circuit, for example, an FPGA, an ASIC, or the like, performs processes such as conversion from the Y color difference domain into the RGB domain and inverse conversion of grayscale compression on the HDR-A video signal "HDR OETF-A" received by the transmission unit 322, and then obtains a linear HDR video signal. The operation of the inverse HDR camera processing unit 302 is performed under control of the CPU 321 on the basis of the information of the HDR-A video signal added to the HDR-A video signal "HDR OETF-A."

Note that, although the example in which the information of the HDR-A video signal is added to the HDR-A video signal "HDR OETF-A" transmitted from the camera 31 has been described above, the information of the HDR-A video signal may be transmitted in communication from the CPU 311 of the camera 31 to the CPU 321 of the CCU 32.

The SDR camera processing unit 324 obtains an SDR video signal by performing level (gain) conversion, color gamut conversion, knee correction, detail (contour) correction, gamma processing, and the like on the linear HDR video signal obtained by the inverse HDR camera processing unit 325, and then transmits the signal to a transmission path 40.

Note that, although the information of the HDR-A video signal "HDR OETF-A" is added to the HDR-A video signal "HDR OETF-A" received by the transmission unit 322, when the HDR-A video signal "HDR OETF-A" is transmitted to the transmission path 39, information of the SDR video signal obtained by the SDR camera processing unit 324, for example, SDR adjustment parameter information ("Relative-Gain," "SDR-Color Gamut," "SDR-Black," "KNEE," and "SDR-Gamma") is further added thereto under control of the CPU 321.

Figure 9:
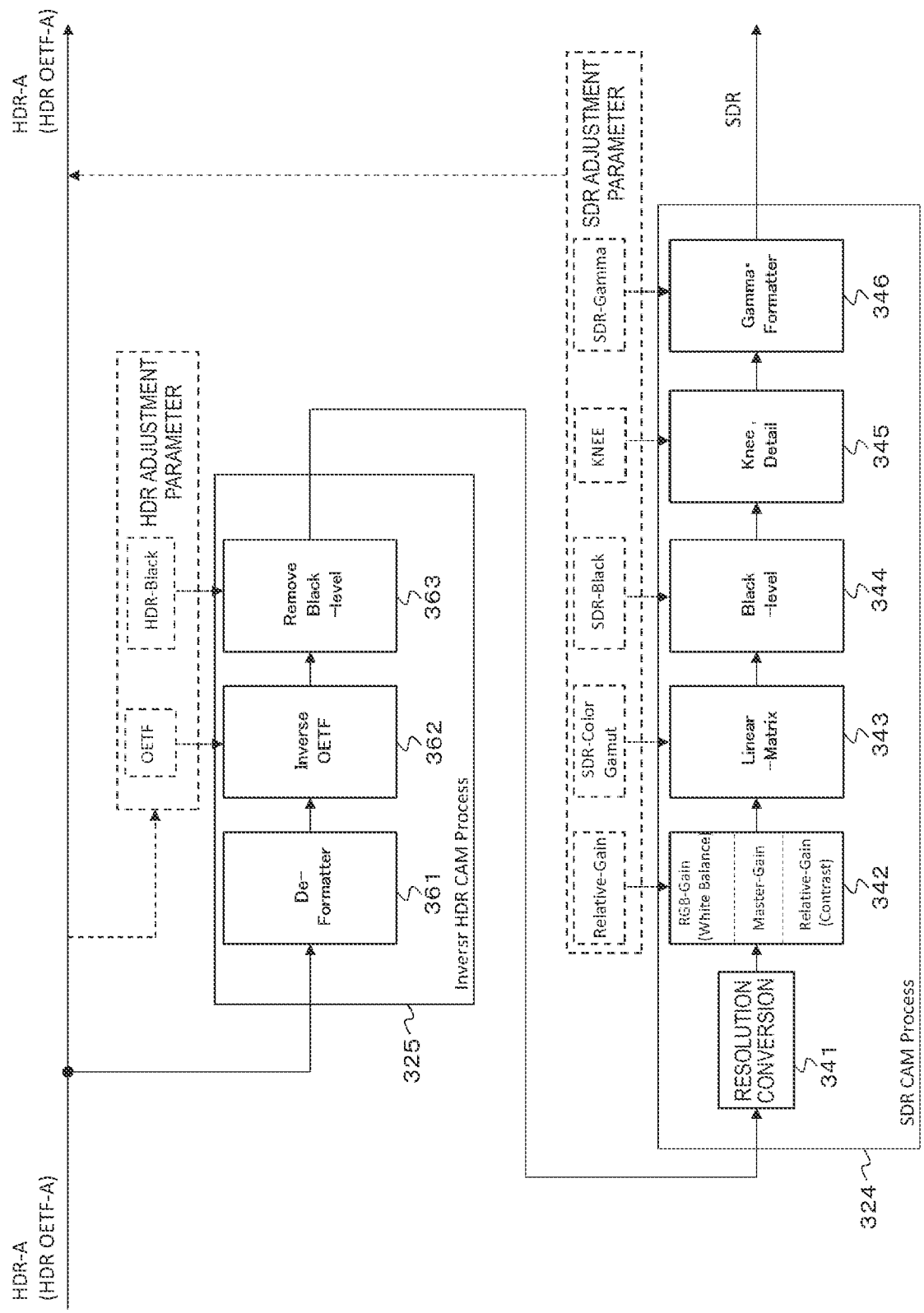
FIG. 9 is a block diagram illustrating a detailed configuration example of an inverse HDR camera processing unit and an SDR camera processing unit constituting the CCU.

FIG. 9 illustrates a detailed configuration example of the inverse HDR camera processing unit 325 and the SDR camera processing unit 324. Note that, this is an example in which the HDR video signal has a UHD (8K, 4K, etc.) resolution, and the SDR camera processing unit 324 has a resolution conversion unit.

The inverse HDR camera processing unit 325 has a de-formatter (De-Formatter) unit 361, an inverse OETF (Inverse-OETF) unit 362, a remove black-level (Remove-Black-level) unit 363.

The de-formatter 361 performs a process of converting the HDR-A video signal "HDR OETF-A" received by the transmission unit 322 (see FIG. 8) from the Y color difference domain into the RGB domain. The inverse OETF unit 362 performs inverse conversion of grayscale compression on the HDR video signal output from the de-formatter 361 on the basis of OETF information (OETF) that is part of the HDR adjustment parameter information, and thereby obtains a linear HDR video signal.

The remove black-level unit 363 returns a black level of the linear HDR video signal output from the inverse OETF unit 362 to the state before the signal was adjusted by a black-level unit of the HDR camera processing unit 315 (see FIG. 8) on the basis of information for black-level correction (HDR-Black) that is part of the HDR adjustment parameter information.

Note that, since a configuration of the SDR camera processing unit 324 is similar to that described with reference to FIG. 7, description thereof will be omitted here.

Figure 10:
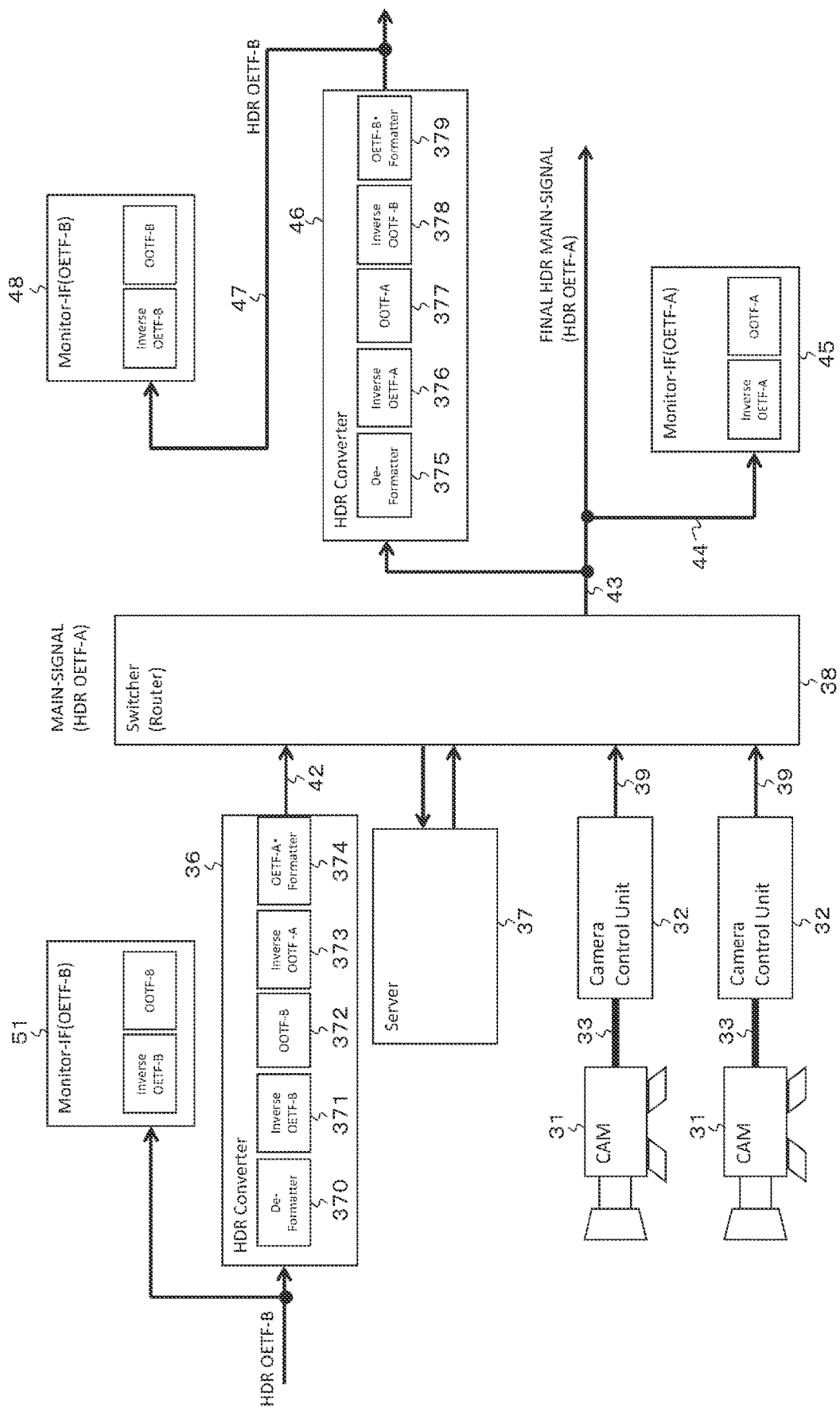
FIG. 10 is a block diagram illustrating a detailed configuration example of HDR converters of the video system.

FIG. 10 illustrates a detailed configuration example of an HDR converter 36 and an HDR converter 46. Here, an example in which the HDR converter 36 converts an HDR-B video signal into an HDR-A video signal, and the HDR converter 46 converts an HDR-A video signal into an HDR-B video signal is shown.

The HDR converter 36 has a de-formatter unit 370, an inverse OETF-B unit 371, an OOTF-B unit 372, an inverse OOTF-A unit 373, and an OETF-A•formatter unit 374.

The de-formatter unit 370 performs a process of converting an input HDR-B video signal "HDR OETF-B" that has undergone the grayscale compression process of the signal interface B from the Y color difference domain into the RGB domain. The inverse OETF-B unit 371 performs the grayscale decompression process corresponding to the grayscale compression process of the signal interface B on the HDR video signal output from the de-formatter unit 370. The grayscale decompression process mentioned here is performed using inverse characteristics of the opto-electrical transfer function (OETF) for the signal interface B.

The OOTF-B unit 372 adds characteristics of the system gamma (OOTF) of the signal interface B to the linear HDR video signal output from the inverse OETF-B unit 371. The inverse OOTF-A unit 373 adds characteristics that cancel out the characteristics of the system gamma (OOTF) of the signal interface A on the HDR video signal output from the OOTF-B unit 372.

The OETF-A•formatter unit 374 performs the grayscale compression process of the signal interface A on the HDR video signal output from the inverse OOTF-A unit 373. The grayscale compression process mentioned here refers to a process of compressing a bit length from a linear area using the opto-electrical transfer function (OETF) for the signal interface A. In addition, the OETF-A•formatter unit 374 converts the grayscale-compressed HDR video signal from the RGB domain into the Y color difference domain, obtains an HDR-A video signal "HDR OETF-A" that has undergone the grayscale compression process of the signal interface A, and then transmits the signal to a transmission path 42.

The HDR converter 36 has the OOTF-B unit 372 and the inverse OOTF-A unit 373 as described above. For this reason, in a case in which the HDR-A video signal "HDR OETF-A" obtained by the HDR converter 36 is monitored on a monitor 45 corresponding to the signal interface A, a video displayed on the monitor 45 is identical to the video displayed on a monitor 51 corresponding to the signal interface B for monitoring the HDR-B video signal "HDR OETF-B" that is an input of the HDR converter 36.

The HDR converter 46 has a de-formatter unit 375, an inverse OETF-A unit 376, an OOTF-A unit 377, an inverse OOTF-B unit 378, and an OETF-B•formatter unit 379.

The de-formatter unit 375 performs a process of converting the HDR-A video signal "HDR OETF-A" that has undergone the grayscale compression process of the signal interface A extracted by a switcher 38 from the Y color difference domain into the RGB domain. The inverse OETF-A unit 376 performs the grayscale decompression process corresponding to the grayscale compression process of the signal interface A on the HDR video signal output from the de-formatter unit 375. The grayscale decompression process mentioned here is performed using the inverse characteristics of the opto-electrical transfer function (OETF) for the signal interface A.

The OOTF-A unit 377 adds characteristics of the system gamma (OOTF) of the signal interface A to the linear HDR video signal output from the inverse OETF-A unit 376. The inverse OOTF-B unit 378 adds characteristics that cancel out the characteristics of the system gamma (OOTF) of the signal interface B on the HDR video signal output from the OOTF-A unit 377.

The OETF-B•formatter unit 379 performs the grayscale compression process of the signal interface B on the HDR video signal output from the inverse OOTF-B unit 378. The grayscale compression process mentioned here refers to a process of compressing a bit length from a linear area using the opto-electrical transfer function (OETF) for the signal interface B. In addition, the OETF-B•formatter unit 379 converts the grayscale-compressed HDR video signal from the RGB domain into the Y color difference domain, obtains an HDR-B video signal "HDR OETF-B" that has undergone the grayscale compression process of the signal interface B, and then outputs the signal.

The HDR-B video signal "HDR OETF-B" obtained by the HDR converter 46 as described above can be monitored by a monitor 48 corresponding to the signal interface B. The HDR converter 46 has the OOTF-A unit 377 and the inverse OOTF-B unit 378. For this reason, a video displayed on the monitor 48 is identical to the video displayed on the monitor 45 for monitoring the HDR-A video signal "HDR OETF-A" that is an input of the HDR converter 46.

Figure 11:
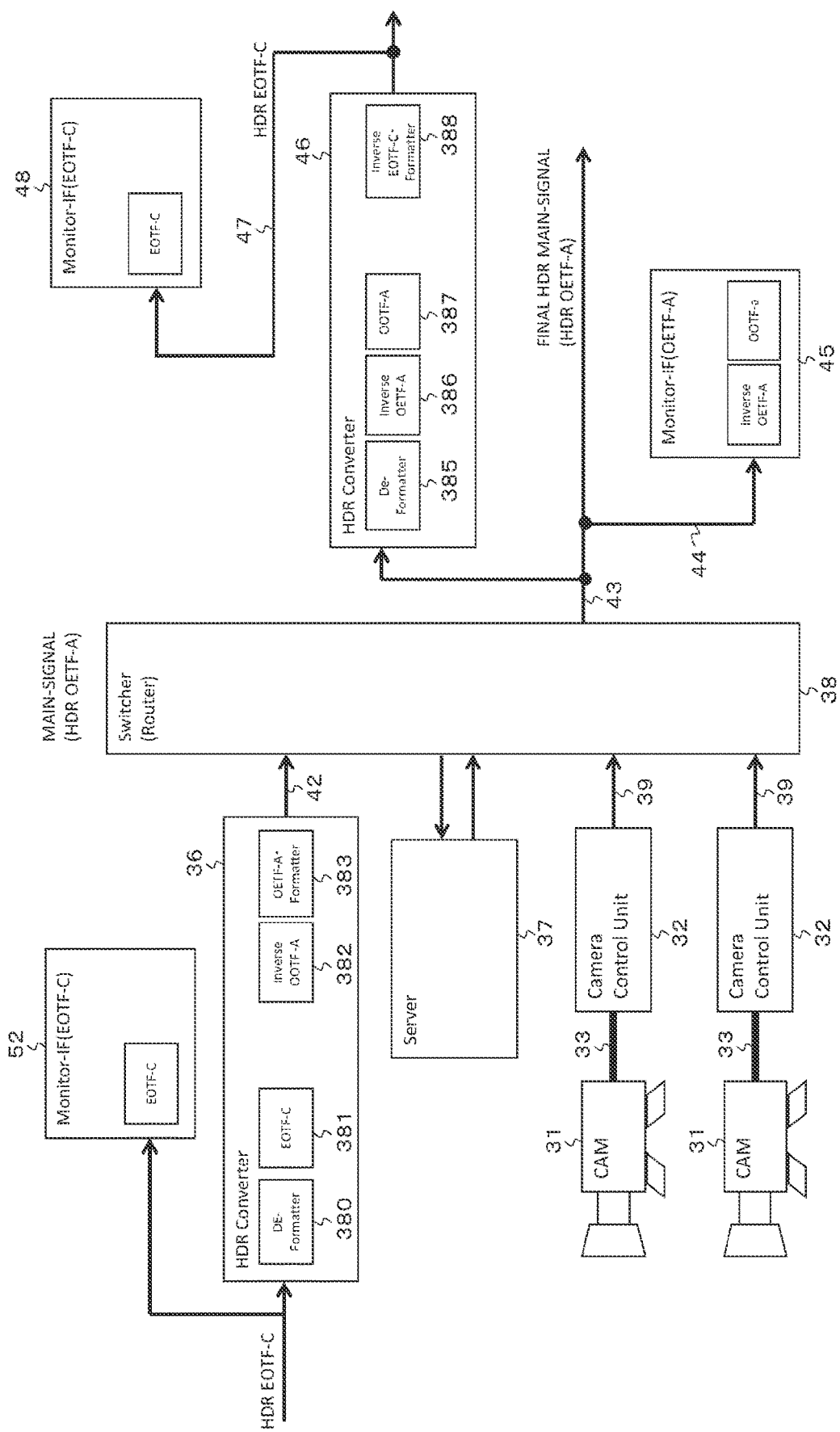
FIG. 11 is a block diagram illustrating another detailed configuration example of HDR converters of the video system.

FIG. 11 also illustrates a detailed configuration example of an HDR converter 36 and an HDR converter 46. Here, an example in which the HDR converter 36 converts an HDR-C video signal into an HDR-A video signal, and the HDR converter 46 converts an HDR-A video signal into an HDR-C video signal is shown.

The HDR converter 36 has a de-formatter unit 380, an EOTF-C unit 281, an inverse OOTF-A unit 382, and an OETF-A•formatter unit 383.

The de-formatter unit 380 performs a process of converting an input HDR-C video signal-C "HDR EOTF-C" that has undergone the grayscale compression process of the signal interface C from the Y color difference domain into the RGB domain. The EOTF-C unit 381 performs the grayscale decompression process corresponding to the grayscale compression process of the signal interface C on the HDR video signal output from the de-formatter unit 380. The grayscale decompression process mentioned here is performed using the electro-optical transfer function (EOTF) for the signal interface C. The inverse OOTF-A unit 382 adds characteristics that cancel out the characteristics of the system gamma (OOTF) of the signal interface A to the HDR video signal output from the EOTF-C unit 281.

The OETF-A•formatter unit 383 performs the grayscale compression process of the signal interface A on the HDR video signal output from the inverse OOTF-A unit 382. The grayscale compression process mentioned here refers to a process of compressing a bit length from a linear area using the opto-electrical transfer function (OETF) for the signal interface A. In addition, the OETF-A•formatter unit 383 converts the grayscale-compressed HDR video signal from the RGB domain into the Y color difference domain, obtains an HDR-A video signal "HDR OETF-A" that has undergone the grayscale compression process of the signal interface A, and then transmits the signal to a transmission path 42.

The HDR converter 36 does not have the inverse OOTF-C unit 126 (see FIG. 1) but has the inverse OOTF-A unit 382 as described above. For this reason, in a case in which the HDR-A video signal "HDR OETF-A" obtained by the HDR converter 36 is monitored on a monitor 45 corresponding to the signal interface A, a video displayed on the monitor 45 is identical to the video displayed on the monitor 52 corresponding to the signal interface C for monitoring the HDR-C video signal "HDR OETF-C" that is an input of the HDR converter 36.

The HDR converter 46 has a de-formatter unit 385, an inverse OETF-A unit 386, an OOTF-A unit 387, and an inverse EOTF-C-formatter unit 388. The de-formatter unit 385 performs a process of converting the HDR-A video signal "HDR OETF-A" that has undergone the grayscale compression process of the signal interface A extracted by a switcher 38 from the Y color difference domain into the RGB domain.

The inverse OETF-A unit 386 performs the grayscale decompression process corresponding to the grayscale compression process of the signal interface A on the HDR video signal output from the de-formatter unit 385. The grayscale decompression process mentioned here is performed using inverse characteristics of the opto-electrical transfer function (OETF) for the signal interface A. The OOTF-A unit 387 adds the characteristics of the system gamma (OOTF) of the signal interface A on the linear HDR video signal output from the inverse OETF-A unit 386.

The inverse EOTF-C-formatter unit 388 performs the grayscale compression process of the signal interface C on the HDR video signal output from the OOTF-A unit 387. The grayscale compression process mentioned here refers to a process of compressing a bit length from a linear area using inverse characteristics of the electro-optical transfer function (EOTF) for the signal interface C. In addition, the inverse EOTF-C-formatter unit 388 converts the grayscale-compressed HDR video signal from the RGB domain to the Y color difference domain, and thereby obtains an HDR-C video signal "HDR EOTF-C" that has undergone the grayscale compression process of the signal interface C, and outputs the signal.

The HDR-C video signal "HDR EOTF-C" obtained by the HDR converter 46 as described above can be monitored on a monitor 48 corresponding to the signal interface C. The HDR converter 46 has the OOTF-A unit 387, but does not have the OOTF-C unit 126 (see FIG. 1) as described above. For this reason, the video displayed on the monitor 48 is identical to the video displayed on the monitor 45 for monitoring the HDR-A video signal "HDR OETF-A" that is an input of the HDR converter 46.

Note that, the HDR converter 46 is a processor including a circuit, for example, an FPGA, an ASIC, or the like as described above. Although the video system 30 can also have the HDR converter 46 that converts the HDR-A video signal "HDR OETF-A" into the HDR-B video signal "HDR OETF-B" as illustrated in FIG. 10 described above and the HDR converter 46 that converts the HDR-A video signal "HDR OETF-A" into the HDR-C video signal "HDR EOTF-C" as illustrated in FIG. 11 described above in parallel, a configuration in which functions of one HDR converter 46 are used by switching is also conceivable. In this case, only an output signal interface is set by a user, and the setting of an input signal interface may be automatically converted on the basis of information of the HDR video signal added to the HDR-A video signal "HDR OETF-A."

Figure 12:
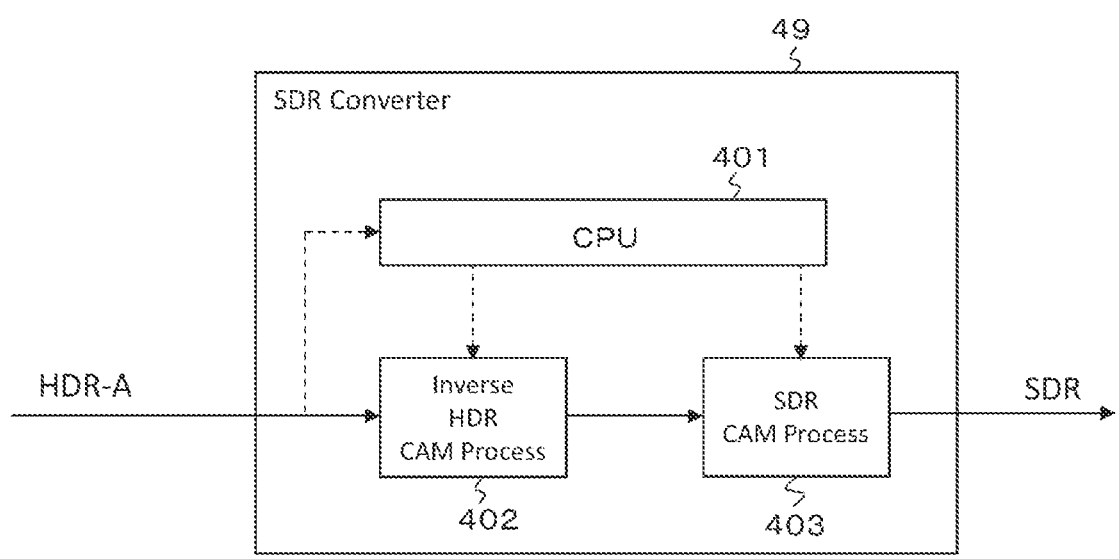
FIG. 12 is a block diagram illustrating a configuration example of an SDR converter of the video system.

FIG. 12 illustrates a configuration example of the SDR converter 49. The SDR converter 49 has a CPU 401, an inverse HDR camera processing (Inverse HDR-CAM Process) unit 402, and an SDR camera processing (SDR CAM Process) unit 403. The CPU 401 controls operations of each unit of the SDR converter 49.

The inverse HDR camera processing unit 402 is a processor including a circuit, for example, an FPGA, an ASIC, or the like, performs a process of converting the HDR-A video signal "HDR OETF-A" that has undergone the grayscale compression process of the signal interface A extracted by the switcher 38 from the Y color difference domain into the RGB domain, inverse conversion of grayscale compression, and the like, and thereby obtains a linear HDR video signal. This operation of the inverse HDR camera processing unit 402 may be performed on the basis of the information of the HDR-A video signal added to the HDR-A video signal "HDR OETF-A" under control of the CPU 401.

The SDR camera processing unit 403 performs level (gain) conversion, color gamut conversion, knee correction, detail (contour) correction, gamma processing, and the like on the linear HDR video signal obtained by the inverse HDR camera processing unit 402, then obtains and transmits an SDR video signal. This operation of the SDR camera processing unit 403 may be performed on the basis of information of the SDR video signal added to the HDR-A video signal "HDR OETF-A" under control of the CPU 401.

Figure 13:
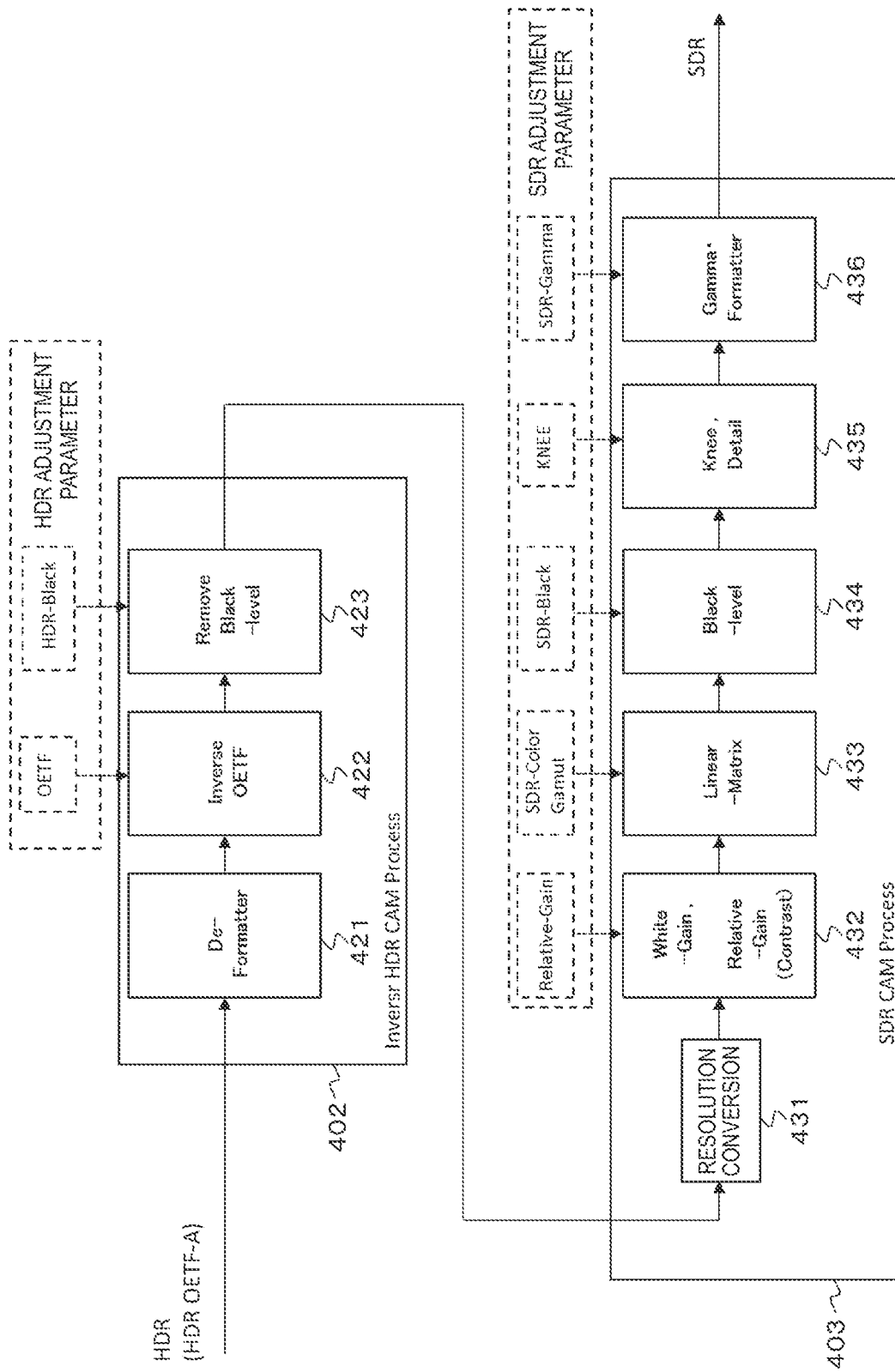
FIG. 13 is a block diagram illustrating a detailed configuration example of an inverse HDR camera processing unit and an SDR camera processing unit constituting the SDR converter.

FIG. 13 illustrates a detailed configuration example of the inverse HDR camera processing unit 402 and the SDR camera processing unit 403. Note that, this is an example in which the HDR video signal has a UHD (8K, 4K, etc.) resolution, and the SDR camera processing unit 403 may have a resolution conversion unit.

The inverse HDR camera processing unit 402 has a de-formatter (De-Formatter) unit 421, an inverse OETF (Inverse-OETF) unit 422, and a remove black-level (Remove-Black-level) unit 423.

The de-formatter unit 421 performs a process of converting the HDR-A video signal "HDR OETF-A" that has undergone the grayscale compression process of the signal interface A extracted by the switcher 38 from the Y color difference domain into the RGB domain. The inverse OETF unit 422 performs inverse conversion of the grayscale compression on the HDR videos signal output from the de-formatter unit 421 on the basis of OETF information (OETF) that is part of the HDR adjustment parameter information, and thereby obtains a linear HDR video signal.

The remove black-level unit 423 returns a black level of the linear HDR video signal output from the inverse OETF unit 422 to the state before the signal was adjusted on the basis of information for black-level correction (HDR-Black) that is part of the HDR adjustment parameter information.

The SDR camera processing unit 403 has a resolution conversion unit 431, an SDR gain adjustment unit 432, a linear matrix (Linear-Matrix) unit 433, a black level (Black-level) unit 434, a knee (Knee)•detail (Detail) unit 435, and a gamma (Gamma)•formatter (Formatter) unit 436.

The resolution conversion unit 431 converts the resolution of the linear HDR video signal (Linear HDR Video) obtained by the inverse HDR camera processing unit 402 from UHD into HD. The SDR gain adjustment unit 432 may control a master gain of the linear HDR video signal whose resolution has been converted into an HD resolution by the resolution conversion unit 431 on the basis of information of a relative gain (Relative-Gain) that is part of parameter information regarding levels of the SDR video and the HDR video, and may control a gain of signals of each of primary colors R, G, and B for adjusting white balance.

The linear-matrix unit 433 performs a linear matrix process for color gamut conversion on the HDR video signal output from the SDR gain adjustment unit 432 on the basis of color gamut information (SDR-Color Gamut) that is part of SDR adjustment parameter information and information regarding colors of the SDR video. The black-level unit 434 adjusts a black level of the HDR video signal output from the linear-matrix unit 433 on the basis of information for black level correction (SDR-Black) that is part of the SDR adjustment parameter information. The knee-detail unit 435 performs knee correction on the HDR video signal output from the black-level unit 434 on the basis of information regarding knee correction (KNEE) that is part of the SDR adjustment parameter information, and further performs detail (contour) correction on the SDR video signal.

The gamma•formatter unit 436 performs gamma processing on the linear SDR video signal output from the knee-detail unit 435 on the basis of information regarding compression of a dynamic range (SDR-Gamma) that is part of SDR adjustment parameter information. In addition, the gamma•formatter unit 436 performs conversion of the signal from the RGB domain into the Y color difference domain and thereby obtains an output SDR video signal.

As described above, in the video system 30 illustrated in FIG. 5, the plurality of input apparatuses input the HDR-A video signal that has undergone the grayscale compression process of the signal interface A that is a reference signal interface (standard signal interface) to the switcher 38, and a predetermined HDR video signal extracted by the switcher 38 is an HDR-A video signal that undergoes the grayscale compression process of the reference signal interface at all times. Thus, the plurality of input apparatuses can perform uniform video adjustment in monitoring of the video on the monitor 45 corresponding to the reference signal interface (standard signal interface).

In addition, in the HDR converter 46 of the video system 30 illustrated in FIG. 5, when an HDR video signal that has undergone the grayscale compression process of another signal interface other than the signal interface A is output, a process of adding the characteristics of the system gamma of the signal interface A is at least performed. Thus, in a case in which the HDR video signal that has undergone the grayscale compression process of the other signal interface is monitored on the monitor 48 corresponding to the interface, the video can be made identical to a video of a case in which the above-described predetermined HDR video signal is monitored on the monitor compatible with the signal interface A (adjusted video).

Note that, although not described above, the HDR converter 36 of the video system 30 (see FIG. 5) according to the fourth embodiment may have a function of changing a video when an HDR-B video signal or an HDR-C video signal is converted into an HDR-A video signal. In this case, the HDR converter 36 may have, for example, a signal processor 441 as illustrated in FIGS. 14(a) and (b).

FIG. 14(a) illustrates a configuration example of an HDR converter 36 that converts an HDR-B video signal into an HDR-A video signal. FIG. 14(b) illustrates a configuration example of an HDR converter 36 that converts an HDR-C video signal into an HDR-A video signal. For example, the signal processor 441 may have a function of manually adjusting brightness as long as a video of the HDR-A video signal output from the HDR converter 36 can be made brighter. In addition, for example, the signal processor 441 may have a function of manually adjusting color as long as color of the HDR-A video signal output from the HDR converter 36 can be changed.

Figure 15:
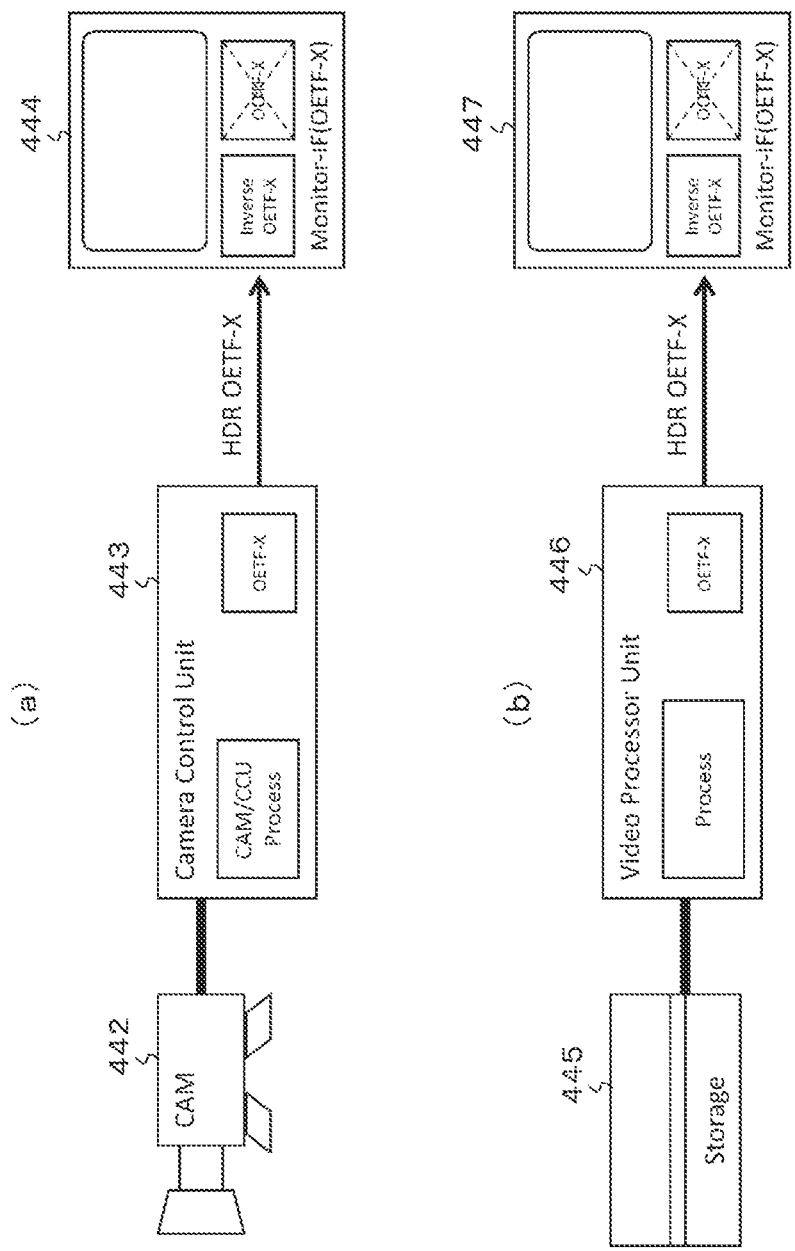
FIG. 15 is a diagram for describing that a video signal produced in a situation in which a monitor side does not have an OOTF function as an HDR-B video signal or an HDR-C video signal input to the HDR converter can be taken into account.

In addition, as the HDR-B video signal and the HDR-C video signal input to the HDR converters 36, video signals produced in a situation in which an OOTF function is not provided on the monitor side can be considered as illustrated in FIGS. 15(a) and (b). FIG. 15(a) is an example in which a linear HDR signal from a camera 442 is processed by a camera control unit (CCU) 443 and an HDR-X video signal "HDR OETF-X" that has undergone a grayscale compression process of a signal interface X is obtained, illustrating that a monitor 444 for monitoring the video signal does not have an OOTF function. FIG. 15(b) is an example in which a linear HDR signal from a storage 445 is processed by a video processor unit (BPU) 446 and an HDR-X video signal "HDR OETF-X" that has undergone the grayscale compression process of the signal interface X is obtained, illustrating that a monitor 447 for monitoring the video signal does not have an OOTF function.

In this case, the following case (1) and case (2) are conceivable.

Case (1): A video, simply as material data of a video, of a case in which no adjustment (so-called post-production) is performed for the video, only capturing of a camera video being performed.

Case (2): A video of a case in which all operations including adjusting how the video appears are included in video adjustment in a monitor viewing environment without an OOTF.

Although there is no particular problem in the case of Case (1), in the case of Case (2), it should be judged that the video includes characteristics of system gamma (OOTF-x). In addition, in the case of the signal interface defined with the electro-optical transfer function (EOTF), for example, the signal interface C, the process of adding the system gamma (OOTF) is not performed on the monitor side originally, and thus the cases can be regarded as being equivalent.

Figure 16:
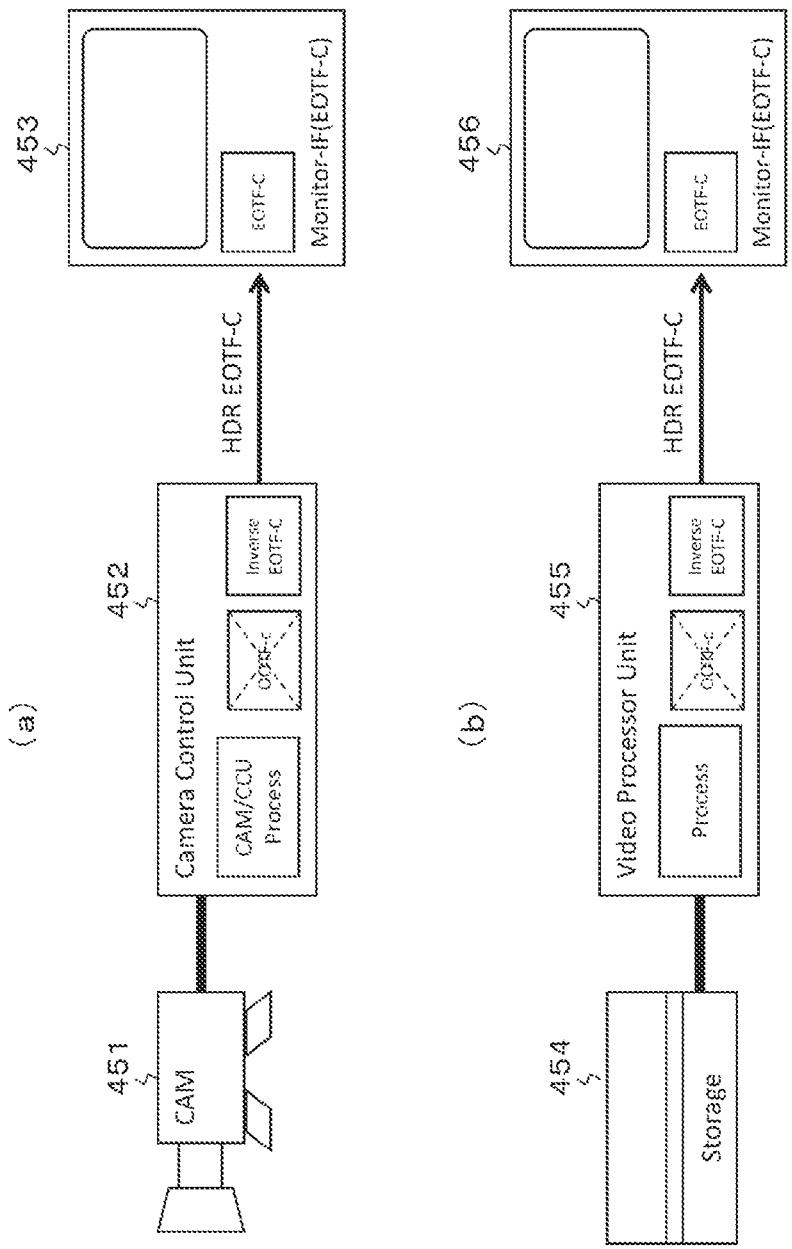
FIG. 16 is a diagram for describing a case in which a process of adding a system gamma (OOTF) is not performed in signal processing of an HDR-C video signal on an output side.

Even in a case in which the process of adding the system gamma (OOTF) is not actually performed in signal processing on the output side of the UDR-C video signal as illustrated in FIGS. 16(a) and (b), it should be judged that characteristics of the system gamma (OOTF) are being considered in a case corresponding to Case (2) (a case in which a video on the monitor is a completed video).

Note that, FIG. 16(a) is an example in which a linear HDR signal from a camera 451 is processed by a camera control unit (CCU) 452 and thereby an HDR-C video signal is obtained, illustrating that the video signal is being monitored on a monitor 453 corresponding to the signal interface C. In addition, FIG. 16(b) is an example in which a linear HDR signal from a storage 454 is processed by a video processor unit (BPU) 455 and thereby an HDR-C video signal is obtained, illustrating that the video signal is being monitored on a monitor 456 corresponding to the signal interface C.

In the case of the above-described Case (1), the process of adding the characteristics of the system gamma (OOTF) is not performed in the HDR converter 36 as illustrated in FIGS. 17(a) and (b), and signal processing may be performed in order to obtain a desired video in a standard monitoring environment of the signal interface A.

In addition, in the case of the above-described Case (2) with the signal interface defined with the opto-electrical transfer function (OETF), for example, only processes of converting signal interfaces of OETF/EOTF and cancelling out the system gamma (OOTF-A) of the signal interface A that is a conversion destination may be performed, without performing the process of the system gamma (OOTF-B) of the signal interface B, as illustrated in FIG. 18(a).

In addition, in the case of the above-described Case (2) with the signal interface defined with the electro-optical transfer function (EOTF), for example, only processes of converting the signal interfaces of OETF/EOTF and cancelling out the system gamma (OOTF-A) of the signal interface A that is a conversion destination may be performed as illustrated in FIG. 18(b).

5. FIFTH EMBODIMENT

[Configuration Example of HDR Production Live System]

Figure 19:
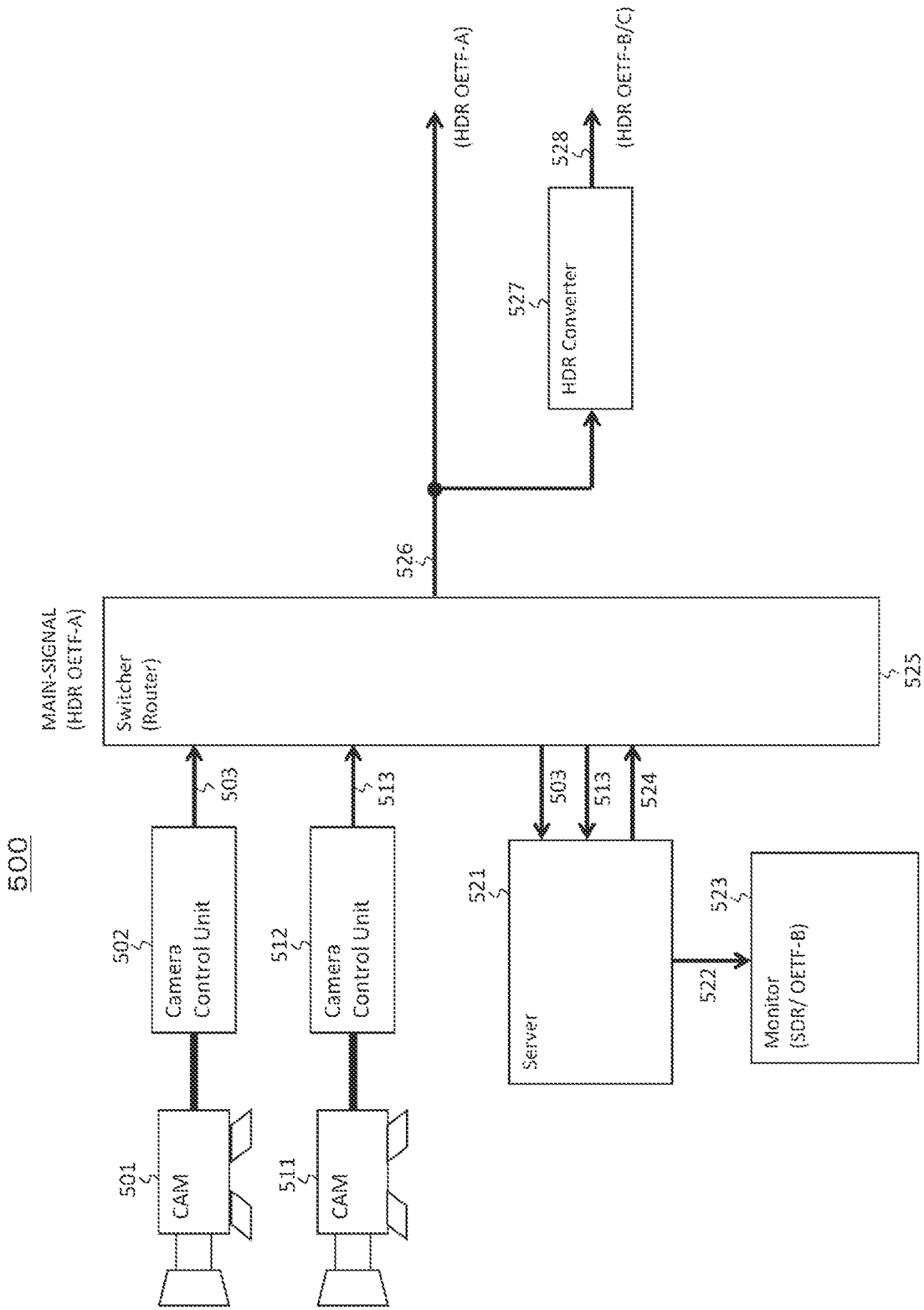
FIG. 19 is a block diagram illustrating a configuration example of an HDR production live system as a fifth embodiment.

FIG. 19 illustrates a configuration example of an HDR production live system 500 as a fifth embodiment. The HDR production live system 500 has a predetermined number of camera systems each including a camera and a camera control unit (CCU). In this embodiment, there are two camera systems including a camera system having a camera 501 and a CCU 502 and a camera system having a camera 511 and a CCU 512.

The CCUs 502 and 512 performs processes of making images on captured video signals from the cameras 501 and 511. High dynamic range (HDR) video signals (HDR-A video signals) that have undergone the grayscale compression process of the signal interface A are obtained from the CCUs 502 and 512. In this embodiment, the signal interface A is set as a reference signal interface (standard signal interface). For example, the signal interface A is "S-Log 3."

In addition, the HDR production live system 500 has a server (Server) 521 that performs recording and reproduction of a video file for replay/reproduction and the like. Files recorded in the server 521 include video files acquired by communication from an external apparatus such as a personal computer (PC) in addition to files of video signals 503 and 513 output from the CCUs 502 and 512.

The video signals 503 and 513 output from the CCUs 502 and 512 are transmitted to the server 521 via a switcher 525, which will be described below, as SDI signals. Information of the signal interface A is added to, for example, a payload ID area and a VANC area of the SDI signals as metadata. Accordingly, the server 521 can recognize that the video signals 503 and 513 output from the CCUs 502 and 512 are HDR-A video signals and the information of the signal interface A are added to files of the video signals 503 and 513 as attribute information. Note that, the information of the signal interface is likewise added to a video file input from an external apparatus such as a personal computer (PC), and accordingly the server 521 can recognize the signal interface for the video signal included in the file.

Here, a video signal input from an external apparatus such as a personal computer (PC) and included in a video file is not limited to the above-described HDR-A video signal, and an HDR video signal that has undergone the grayscale compression process of the signal interface B (HDR-B video signal), an HDR video signal that has undergone the grayscale compression process of the signal interface C (HDR-C video signal), or a standard dynamic range (SDR) video signal is conceivable. The signal interface B is, for example, "Hybrid Log-Gamma (HLG)," and the signal interface C is "Perceptual Quantizer (PQ)."

In addition, the HDR production live system 500 has a monitor 523 for appropriately checking a video included in a file recorded in a storage 537 in an operation by an operator of the server 521. A video signal 522 corresponding to the signal interface corresponding to the monitor 523 is transmitted from server 521 to the monitor 523 as an SDI signal. In this embodiment, the monitor 523 is, for example, an SDR monitor or an HDR monitor compatible with the signal interface B, and the monitor 523 receives supply of an SDR video signal or an HDR-B video signal as the video signal 522 from the server 521.

In addition, the HDR production live system 500 has the switcher (Switcher) 525. The HDR-A video signals 503 and 513 output from the CCUs 502 and 512 are input to the switcher 525 as SDI signals. As described above, information of the signal interface A is added to, for example, a payload ID area and a VANC area of the SDI signals as metadata.

In addition, a video signal 524 reproduced by the server 521 is also input to the switcher 525. The video signal 524 is an HDR video signal that has undergone the grayscale compression process of the signal interface A (HDR-A video signal), and is transmitted from the server 521 to the switcher 525 as an SDI signal. The information of the signal interface A is added to, for example, a payload ID area and a VANC area of the SDI signals as metadata.

The switcher 525 selectively extracts and outputs a predetermined HDR-A video signal from the HDR-A video signals input from the plurality of input apparatuses such as the camera systems, the servers 521, and the like, or mixes and outputs an arbitrary video signal among the HDR-A video signals input from the plurality of input apparatuses. An HDR-A video signal 526 serving as a main line signal extracted by the switcher 525 is output as an SDI signal without change.

The HDR production live system 500 has an HDR converter (HDR-Converter) 527. The predetermined HDR-A video signal 526 extracted by the switcher 525 is transmitted to the HDR converter 527 as an SDI signal. The HDR converter 527 converts the HDR-A video signal into an HDR video signal 528, for example, an HDR-B video signal or an HDR-C video signal and outputs the signal. The HDR video signal 528 is output as an SDI signal. Information of the signal interface is added to, for example, a payload ID area and a VANC area of the SDI signal as metadata.

Figure 20:
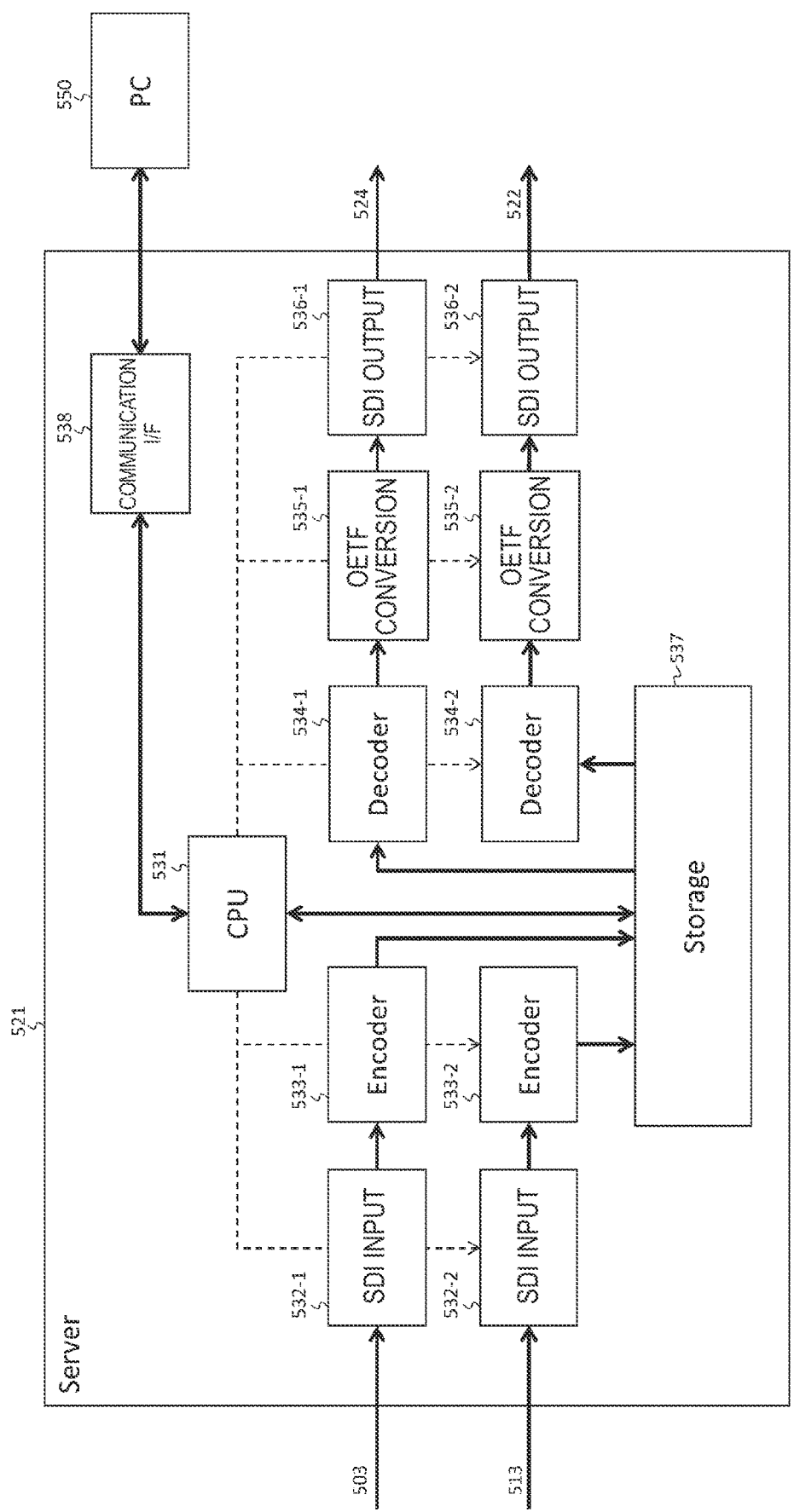
FIG. 20 is a block diagram illustrating a configuration example of a server.

FIG. 20 illustrates a configuration example of the server 521. Solid line arrows in the drawing represent flows of signals, and dashed line arrows represent directions of controls. Although there are two input systems and two output systems in the illustrated example, the number of systems is not limited thereto.

The server 521 has a CPU 531, serial digital interface (SDI) input units 532-1 and 532-2, encoders 533-1 and 533-2, decoders 534-1 and 534-2, opto-electrical transfer function (OETF) conversion units 535-1 and 535-2, SDI output units 536-1 and 536-2, a storage 537, and a communication interface 538.

The CPU 531 controls operations of each of the units of the server 521. The SDI input units 532-1 and 532-2 receive SDI signals and extract video signals and metadata from the SDI signals. The metadata also includes information of signal interfaces of video signals included in the SDI signals. The SDI input units 532-1 and 532-2 transmit the metadata extracted from the SDI signals to the CPU 531. Accordingly, the CPU 531 can recognize the signal interfaces of the video signals included in the SDI signals.

The encoders 533-1 and 533-2 perform an encoding process in a compression format, for example, XAVC, or the like on the video signals extracted from the SDI signals by the SDI input units 532-1 and 532-2 and generate files (recording files). Note that, information of the signal interfaces of the video signals are added to the files as attribute information. The files generated by the encoders 533-1 and 533-2 are recorded in the storage 537 and reproduced under control of the CPU 531.

Here, the SDI input unit 532-1 and the encoder 533-1 constitute a first input system. In addition, the SDI input unit 532-1 receives the HDR-A video signal 503 output from the CCU 502 as an SDI signal. In addition, the SDI input unit 532-2 and the encoder 533-2 constitute a second input system. In addition, the SDI input unit 532-2 receives the HDR-A video signal 513 output from the CCU 512 as an SDI signal.

The communication interface 538 is, for example, an Ethernet interface, acquires files of past videos and computer graphic (CG) videos (video files) by communicating with a personal computer (PC) 550 as an external apparatus, and transmits the files to the CPU 531. These files are recorded in the storage 537 and reproduced under control of the CPU 531. Here, "Ethernet," or "Ethernet" is a registered trademark.

The information of the signal interfaces of the video signals are also added to the files as attribute information. In this case, the video signals included in the files may be SDR video signals, and, if the signals are HDR video signal, they are likely to correspond to various signal interfaces of an HDR-A video signal, an HDR-B video signal, an HDR-C video signal, and the like.

Note that, the CPU 531 can extract a file from the storage 537 and transmit the file to the PC 550 through the communication interface 538. Accordingly, editing of the file and the like are performed with the PC 550, and an edited file can also be returned to the storage 537.

The decoders 534-1 and 534-2 perform decoding processes on the reproduced files (video files) from the storage 537 and thereby obtain baseband reproduction video signals. The reproduction video signals have undergone a grayscale compression process corresponding to a first signal interface, including an HDR-A video signal, an HDR-B video signal, an HDR-C video signal, an SDR video signal, and the like.

The OETF conversion units 535-1 and 535-2 perform OETF conversion processes on the reproduction video signal obtained by the decoders 534-1 and 534-2 and obtain output video signals that have undergone a grayscale compression process corresponding to a second signal interface that is an output signal interface. Note that, the first signal interface of the reproduction video signals is the same as the second signal interface of the output video signals, and the OETF conversion units 535-1 and 535-2 set the reproduction video signals as output video signals without change, performing no OETF conversion process.

The OETF conversion units 535-1 and 535-2 perform a process setting on the basis of information of the first signal interface of the reproduction video signals and information of the second signal interface of the output video signals. The processing setting by the OETF conversion units 535-1 and 535-2 is performed under control of the CPU 531. The CPU 531 can obtain the information of the first signal interface of the reproduction video signals from the attribute information added to the files, and obtain the information of the second signal interface of the output video signals from information of the setting made at the time of the system configuration.

The OETF conversion units 535-1 and 535-2 can each perform an independent process setting. Here, the OETF conversion units 535-1 and 535-2 change the process setting in accordance with a change of the information of the first signal interface of the reproduction video signals when, for example, the reproduction video signals are obtained in continuous reproduction of a plurality of files recorded in the storage 537 as in playlist reproduction.

The SDI output units 536-1 and 536-2 output the output video signals obtained by the OETF conversion units 535-1 and 535-2 as SDI signals. In this case, the SDI output units 536-1 and 536-2 set the information of the second signal interface of the output video signals in, for example, a payload ID area or a VANC area of the SDI signals as metadata.

Here, the decoder 534-1, the OETF conversion unit 535-1, and the SDI output unit 536-1 constitute a first output system. In addition, the HDR-A video signal 524 to be transmitted to the switcher 525 is output from the SDI output unit 536-1 as an SDI signal. In addition, the decoder 534-2, the OETF conversion unit 535-2, and the SDI output unit 536-2 constitute a second output system. In addition, an SDR video signal or an HDR-B video signal to be transmitted to the monitor 523 is output from the SDI output unit 536-2 as an SDI signal 522.

Figure 21:
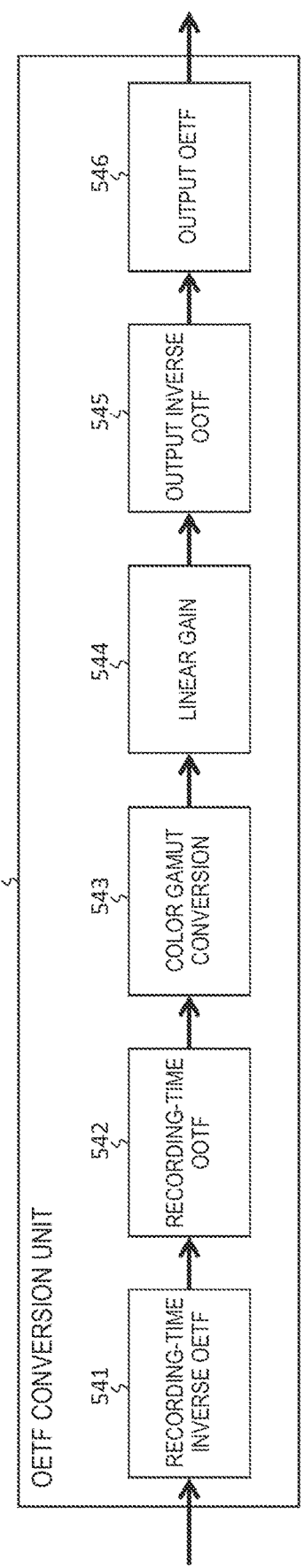
FIG. 21 is a block diagram illustrating a configuration example of an OETF conversion unit.

FIG. 21 illustrates a configuration example of the OETF conversion unit 535 (535-1 or 535-2). The OETF conversion unit 535 has a recording-time inverse OETF unit 541, a recording-time OOTF unit 542, a color gamut conversion unit 543, a linear gain unit 544, an output inverse OOTF unit 545, and an output OETF unit 546. Here, description will be provided on the assumption that the reproduction video signal is a video signal of a signal interface X, and the output video signal is a video signal of a signal interface Y.

The recording-time inverse OETF unit 541 performs a grayscale decompression process corresponding to a grayscale compression process of the signal interface X performed on the reproduction video signal on the reproduction video signal of the signal interface X. The grayscale decompression process mentioned here is performed using inverse characteristics of the opto-electrical transfer function (OETF) for the signal interface X. The recording-time OOTF unit 542 adds characteristics of system gamma (OOTF) of the signal interface X on the output video signal of the recording-time inverse OETF unit 541.

The color gamut conversion unit 543 performs a linear matrix process for color gamut conversion on the output video signal of the recording-time OOTF unit 542. The linear gain unit 544 performs a gain adjustment process on the output video signal of the color gamut conversion unit 543. The color gamut conversion unit 543 is necessary only in a case in which conversion of color gamut between the reproduction video signal and the output video signal is necessary. In addition, the linear gain unit 544 is necessary in a case in which conversion from SDR to HDR or conversely from HDR to SDR is performed between the reproduction video signal and the output video signal.

The output inverse OOTF unit 545 adds characteristics that cancel out characteristics of system gamma (OOTF) of the signal interface Y on the output video signal of the linear gain unit 544. The output OETF unit 546 performs a grayscale compression process of the signal interface Y on the output video signal of the output inverse OOTF unit 545. The grayscale compression process mentioned here is performed using characteristics of the opto-electrical transfer function (OETF) for the signal interface Y.

In the OETF conversion unit 535, the recording-time inverse OETF unit 541 and the recording-time OOTF unit 542 are set on the basis of the signal interface X of the reproduction video signal, and the output inverse OOTF unit 545 and the output OETF unit 546 are set on the basis of the signal interface Y of the output video signal. Accordingly, the output OETF conversion unit 535 obtains the output video signal that has undergone the grayscale compression process of the signal interface Y from the reproduction video signal that has undergone the grayscale compression process of the signal interface X.

FIG. 22 illustrates representative examples of actual set values of the OETF conversion unit 535 (see FIG. 21). The example (a) is an example of a case in which the signal interface of the reproduction video signal (recording-time OETF) is "S-Log 3," and the signal interface of the output video signal (output OETF) is "SDR." In addition, the color gamut of the reproduction video signal is "BT.2020" and the color gamut of the output video signal is "BT.709" in that case. This example is used for an OETF conversion process on the server 521 side in a case in which, for example, the monitor 523 is an SDR monitor.

In the case of the example (a), the recording-time inverse OETF unit 541 is set to perform the grayscale decompression process (S-Log 3 Inverse OETF) of "S-Log 3." The recording-time OOTF unit 542 is set to add characteristics of system gamma (OOTF) of "S-Log 3." The color gamut conversion unit 543 is set to perform the linear matrix process of converting the color gamut from "BT.2020" to "BT.709." The linear gain unit 544 is set to lower a gain from an HDR gain to an SDR gain. The output inverse OOTF unit 545 is set to perform no process, that is, to output an input without change. Furthermore, the output OETF unit 546 is set to perform the grayscale compression process of "SDR" (SDR Inverse EOTF).

In addition, the example (b) is an example in which the signal interface of the reproduction video signal (recording-time OETF) is "SDR" and the signal interface of the output video signal (output OETF) is "S-Log 3." In addition, the color gamut of the reproduction video signal is "BT.709" and the color gamut of the output video signal is "BT.2020" in that case. This example is used in a case in which, for example, a file from the storage 537 including a video signal of which the signal interface is for "SDR" is reproduced and a video signal of "S-Log 3" is input to the switcher 525.

In the case of the example (b), the recording-time inverse OETF unit 541 is set to perform the grayscale decompression process of "SDR" (SDR EOTF). The recording-time OOTF unit 542 is set to perform no process, that is, to output an input without change. The color gamut conversion unit 543 is set to perform a linear matrix process of converting the color gamut from "BT.709" to "BT.2020." The linear gain unit 544 is set to increase a gain from an SDR gain to an HDR gain. The output inverse OOTF unit 545 is set to cancel out the characteristics of the system gamma (OOTF) of "S-Log 3." Furthermore, the output OETF unit 546 is set to perform the grayscale compression process of "S-Log 3" (S-Log 3 OETF).

In addition, the example (c) is an example in which the signal interface of the reproduction video signal (recording-time OETF) is "HLG" and the signal interface of the output video signal (output OETF) is "S-Log 3." In addition, the color gamut of the reproduction video signal is "BT.2020" and the color gamut of the output video signal also is "BT.2020" in that case. This example is used in a case in which, for example, a file from the storage 537 including a video signal of which the signal interface is for "HLG" is reproduced and a video signal of "S-Log 3" is input to the switcher 525.

In the case of the example (c), the recording-time inverse OETF unit 541 is set to perform a grayscale decompression process of "HLG" (HLG Inverse OETF). The recording-time OOTF unit 542 is set to add characteristics of system gamma (OOTF) of "HLG." The color gamut conversion unit 543 is set to perform no process, that is, to output an input without change. The linear gain unit 544 is set to perform no process, that is, to output an input without change. The output inverse OOTF unit 545 is set to cancel out the characteristics of the system gamma (OOTF) of "S-Log 3." Furthermore, the output OETF unit 546 is set to perform the grayscale compression process of "S-Log 3" (S-Log 3 OETF).

In addition, the example (d) is an example in which the signal interface of the reproduction video signal (recording-time OETF) is "PQ" and the signal interface of the output video signal (output OETF) is "S-Log 3." In addition, the color gamut of the reproduction video signal is "BT.2020" and the color gamut of the output video signal also is "BT.2020" in that case. This example is used in a case in which, for example, a file from the storage 537 including a video signal of which the signal interface is for "PQ" is reproduced and a video signal of "S-Log 3" is input to the switcher 525.

In the case of the example (d), the recording-time inverse OETF unit 541 is set to perform a grayscale decompression process of "PQ" (PQ EOTF). The recording-time OOTF unit 542 is set to perform no process, that is, to output an input without change. The color gamut conversion unit 543 is set to perform no process, that is, to output an input without change. The linear gain unit 544 is set to perform no process, that is, to output an input without change. The output inverse OOTF unit 545 is set to cancel out the characteristics of the system gamma (OOTF) of "S-Log 3." Furthermore, the output OETF unit 546 is set to perform the grayscale compression process of "S-Log 3" (S-Log 3 OETF).

Figure 23:
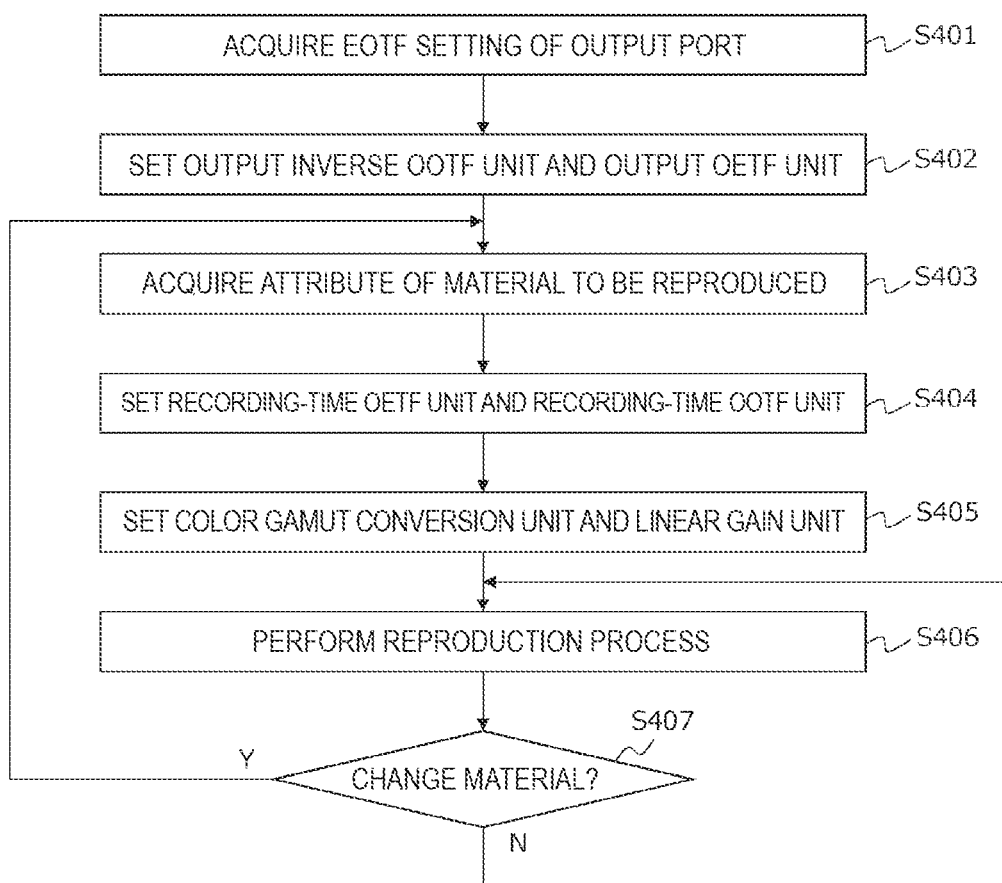
FIG. 23 is a flowchart showing an example of a control process of the OETF conversion unit of a CPU in a case in which files having different types of material information (signal interface information) from a storage are continuously reproduced.

The flowchart of FIG. 23 illustrates an example of a control process of the OETF conversion unit 535 (535-1 or 535-2) by the CPU 531 in a case in which files having varying material information (signal interface information) from the storage 537 are continuously reproduced.

First, the CPU 531 acquires an EOTF setting of an output port, that is, information of a signal interface of an output video signal in Step S401. The CPU 531 acquires the information from, for example, the information of the setting made at the time of the system configuration. Next, the CPU 531 performs a process setting of the output inverse OOTF unit 545 and the output OETF unit 546 on the basis of the EOTF setting of the output port in Step S402.

Next, the CPU 531 acquires attributes of the material to be reproduced, that is, information of the signal interface of the reproduction video signal, in Step S403. The CPU 531 acquires this information from, for example, attribute information added to the files. Next, the CPU 531 performs a process setting of the recording-time inverse OETF unit 541 and the recording-time OOTF unit 542 on the basis of the attributes of the material to be reproduced in Step S404.

Next, in Step S405, the CPU 531 performs a process setting of the color gamut conversion unit 543 and the linear gain unit 544 on the basis of the EOTF setting of the output port acquired in Step S401 and the attributes of the material to be reproduced acquired in Step S403. Then, the CPU 531 performs a reproduction process in Step S406.

In addition, the CPU 531 determines whether or not there is a material change in Step ST407. The CPU 531 can make this determination on the basis of the attribute information added to the file of the material to be reproduced. When it is determined that that is not a material change, the CPU 531 returns to the process of Step S406. On the other hand, when it is determined that that is a material change, the CPU 531 returns to the process of Step S403, performs the process setting of each of the units as described above, and performs a reproduction process.

In the HDR production live system 500 introduced in the above-described fifth embodiment, the server 521 includes the OETF conversion units 535 (535-1 and 535-2) that convert the reproduction video signal that has undergone the grayscale compression process corresponding to the first signal interface into the output video signal that has undergone the grayscale compression process corresponding to the second signal interface in the output system (reproduction system).

Therefore, also in a case in which a material having varying attributes (signal interfaces) from the storage 537 is continuously reproduced, video signals having the signal interfaces can be output in accordance with the setting of the output port. For this reason, work of preparing the signal interfaces when a material is stored in advance is unnecessary, thus a working time can be dramatically reduced, decoding/encoding of a codec at the time of conversion of signal interfaces are also unnecessary, and therefore degradation of image quality can be avoided.

6. MODIFIED EXAMPLES

Note that, in the above-described third embodiment, the example in which the OETF conversion units 535 (535-1 and 535-2) are provided in the server 521 that converts the reproduction video signal that has undergone the grayscale compression process corresponding to the first signal interface into the output video signal that has undergone the grayscale compression process corresponding to the second signal interface has been introduced. A configuration in which a similar OETF conversion unit is provided in the switcher 525 to convert a reproduction video signal that has undergone the grayscale compression process corresponding to the first signal interface into an output video signal that has undergone the grayscale compression process corresponding to the second signal interface in the switcher 525 is also conceivable.

In addition, although the signal interface A, for example, "S-Log 3" is set as a reference signal interface (standard signal interface) in the above-described embodiments, a reference signal interface is not limited thereto. The signal interface B, for example "Hybrid Log-Gamma (HLG)," or the signal interface C, for example, "Perceptual Quantizer (PQ)" may be set as a reference signal interface (standard signal interface).

In addition, although the example in which the present technology is applied to a camera system or a video system that deals with signal interfaces A to C of three types has been introduced in the above-described embodiment, the present technology can of course be similarly applied to a camera system, a video system, or the like that deals with a plurality of types of signal interfaces, together with or separately from the aforementioned signal interfaces.

Additionally, the present technology may also be configured as below.

(1)
A signal processing device including:
a processing unit configured to process a linear high dynamic range video signal and obtain a high dynamic range video signal that has undergone a grayscale compression process,
in which the processing unit is able to perform grayscale compression processes of a plurality of signal interfaces.

(2)
The signal processing device according to (1),
in which the processing unit further performs at least a process of adding characteristics of system gamma of a reference signal interface when a grayscale compression process of another signal interface other than the reference signal interface is performed.

(3)
A signal processing method including:
a processing step of, by a processing unit, processing a linear high dynamic range video signal and obtaining a high dynamic range video signal that has undergone a grayscale compression process,
in which the processing unit is able to perform grayscale compression processes of a plurality of signal interfaces.

(4)
A camera system including:
an imaging unit configured to obtain a linear high dynamic range video signal; and
a processing unit configured to process the linear high dynamic range video signal and thereby obtain a high dynamic range video signal that has undergone a grayscale compression process,
in which the processing unit is able to perform grayscale compression processes of a plurality of signal interfaces.

(5)
A signal processing device including:
a processing unit configured to process a linear high dynamic range video signal and thereby obtain a high dynamic range video signal that has undergone a grayscale compression process of a reference signal interface; and
a signal conversion unit configured to convert the high dynamic range video signal that has undergone the grayscale compression process of the reference signal interface into a high dynamic range video signal that has undergone a grayscale compression process of another signal interface other than the reference signal interface,
in which the signal conversion unit performs each process of a grayscale decompression process corresponding to the grayscale compression process of the reference signal interface, a process of adding characteristics of system gamma of the reference signal interface and a process of cancelling out characteristics of system gamma of another signal interface, and a grayscale compression process of the other signal interface on the high dynamic range video signal that has undergone the grayscale compression process of the reference signal interface.

(6)
A signal processing method including:
a processing step of, by a processing unit, processing a linear high dynamic range video signal and thereby obtaining a high dynamic range video signal that has undergone a grayscale compression process of a reference signal interface;
a signal conversion step of, by a signal conversion unit, converting the high dynamic range video signal that has undergone the grayscale compression process of the reference signal interface into a high dynamic range video signal that has undergone a grayscale compression process of another signal interface other than the reference signal interface,
in which, in the signal conversion step, the high dynamic range video signal that has undergone the grayscale compression process of the reference signal interface undergoes at least each process of a grayscale decompression process corresponding to the grayscale compression process of the reference signal interface, a process of adding characteristics of system gamma of the reference signal interface, and a grayscale compression process of the other signal interface.

(7)
A camera system including:
an imaging unit configured to obtain a linear high dynamic range video signal;
a processing unit configured to process the linear high dynamic range video signal and thereby obtain a high dynamic range video signal that has undergone a grayscale compression process of a reference signal interface; and
a signal conversion unit configured to convert the high dynamic range video signal that has undergone the grayscale compression process of the reference signal interface into a high dynamic range video signal that has undergone a grayscale compression process of another signal interface other than the reference signal interface,
in which the signal conversion unit performs at least each process of a grayscale decompression process corresponding to the grayscale compression process of the reference signal interface, a process of adding characteristics of system gamma of the reference signal interface, and a grayscale compression process of the other signal interface on the high dynamic range video signal that has undergone the grayscale compression process of the reference signal interface.

(8)
A video system including:
an input unit including a plurality of input apparatuses that input a high dynamic range video signal that has undergone a grayscale compression process of a reference signal interface;
an extraction unit configured to selectively extract a predetermined high dynamic range video signal from the plurality of input apparatuses; and
an output unit configured to output a video signal based on the predetermined high dynamic range video signal,
in which the output unit is able to output at least a high dynamic range video signal that has undergone a grayscale compression process of another signal interface other than the reference signal interface, in addition to the high dynamic range video signal that has undergone the grayscale compression process of the reference signal interface, and
the output unit obtains the high dynamic range video signal that has undergone the grayscale compression process of the other signal interface by performing at least each process of a grayscale decompression process corresponding to the grayscale compression process of the reference signal interface, a process of adding characteristics of system gamma of the reference signal interface, and the grayscale compression process of the other signal interface on the predetermined high dynamic range video signal when the high dynamic range video signal that has undergone the grayscale compression process of the other signal interface is to be output.

(9) The video system according to (8),
in which the input unit includes a camera system,
the camera system includes
an imaging unit configured to obtain a linear high dynamic range video signal, and
a processing unit configured to process the linear high dynamic range video signal and thereby obtain a high dynamic range video signal that has undergone the grayscale compression process of the reference signal interface.

(10) The video system according to (8) or (9),
in which the input unit includes a signal conversion unit that converts the high dynamic range video signal that has undergone the grayscale compression process of the other signal interface other than the reference signal interface into the high dynamic range video signal that has undergone the grayscale compression process of the reference signal interface, and
the signal conversion unit performs at least each process of the grayscale decompression process corresponding to the grayscale compression process of the other signal interface, a process of adding a characteristic that cancels out the characteristics of system gamma of the reference signal interface, and the grayscale compression process of the reference signal interface on the high dynamic range video signal that has undergone the grayscale compression process of the other signal interface.

(11) The video system according to any of (8) to (10),
in which the output unit is able to further output a standard dynamic range video signal.

(12) The video system according to (11),
in which information of the predetermined high dynamic range video signal and information of the standard dynamic range video signal produced on the basis of the predetermined high dynamic range video signal are added to the predetermined high dynamic range video signal, and
the output unit processes the predetermined high dynamic range video signal on the basis of the information added to the predetermined high dynamic range video signal and thereby obtains the standard dynamic range video signal when the standard dynamic range video signal is to be output.

(13) A server including:
a reproduction unit configured to reproduce a file recorded in a storage and obtain a reproduction video signal that has undergone a grayscale compression process corresponding to a first signal interface; and
a processing unit configured to process the reproduction video signal and obtain an output video signal that has undergone a grayscale compression process corresponding to a second signal interface.

(14) The server according to (13),
in which the processing unit performs a process setting on the basis of information of the first signal interface of the reproduction video signal and information of the second signal interface of the output video signal.

(15) The server according to (14),
in which, when the reproduction video signal is obtained in continuous reproduction of a plurality of files recorded in the storage, the processing unit changes the process setting in accordance with a change of the information of the first signal interface of the reproduction video signal.

(16) The server according to any of (13) to (15), including:
a plurality of output systems of the reproduction unit and the processing unit,
in which the processing units of the plurality of output systems are able to each perform an independent process setting.

(17) The server according to any of (13) to (16), further including:
an information superimposing unit configured to superimpose information of the second signal interface on the output video signal.

REFERENCE SIGNS LIST 10A, 10B, 10C camera system
11 camera
12, 12B, 12C camera control unit
13 camera cable
14 communication path
15 control panel
16, 17, 18 monitor
19, 20 HDR converter
30 video system
31 camera
32 camera control unit
33 camera cable
34 communication path
35 control panel
36 HDR converter
37 server
38 switcher
39, 40, 42, 44, 47 transmission path
41 SDR monitor
43 main transmission path
45, 48, 51, 52 monitor
46 HDR converter
49 SDR converter
111 CPU
112 imaging unit
113 pre-processing unit
114 transmission unit
121 CPU
122 transmission unit
123 HDR camera processing unit
124 OETF-A•formatter unit
125 OETF-B•formatter unit
126 OOTF-C unit
127 inverse EOTF-C•formatter unit
131 HDR gain adjustment unit
132 linear matrix unit
133 black-level unit 134 detail unit
141, 143 OOTF-A unit
142 inverse OOTF-B unit
144, 146 de-formatter unit
145, 147 inverse OETF-A unit
311 CPU
312 imaging unit
313 pre-processing unit
314 transmission unit
315 HDR camera processing unit
321 CPU
322 transmission unit
323 HDR camera processing unit
324 SDR camera processing unit
325 inverse HDR camera processing unit
331 HDR gain adjustment unit
332 linear matrix unit
333 black-level unit
334 detail unit
335 OETF-A•formatter unit
341 resolution conversion unit
342 SDR gain adjustment unit
343 linear matrix unit
344 black-level unit
345 knee-detail unit
346 gamma•formatter unit
351 CPU
352 operation input unit
361 de-formatter unit
362 inverse OETF unit
363 remove black-level unit
370 de-formatter unit
371 inverse OETF-B unit
372 OOTF-B unit
373 inverse OOTF-A unit
374 OETF-A•formatter unit
375 de-formatter unit
376 inverse OETF-A unit
377 OOTF-A unit
378 inverse OOTF-B unit
379 OETF-B•formatter unit
380 de-formatter unit
381 EOTF-C unit
382 inverse OOTF-A unit
383 OETF-A•formatter unit
385 de-formatter unit
386 inverse OETF unit
387 OOTF-A unit
388 inverse EOTF-C-formatter unit
401 CPU
402 inverse HDR camera processing unit
403 SDR camera processing unit
421 SDR de-formatter unit
422 inverse OETF unit
423 remove black-level unit
431 resolution conversion unit
432 SDR gain adjustment unit
433 linear matrix unit
434 black-level unit
435 knee-detail unit
436 gamma•formatter unit
441 signal processor
442 camera
443 camera control unit
444, 447 monitor
445 storage
446 video processor unit
451 camera
452 camera control unit
453, 456 monitor
454 storage
455 video processor unit
500 HDR production live system
501, 511 camera
502, 512 camera control unit
521 server
523 monitor
525 switcher
527 HDR converter
531 CPU
532-1, 532-2 SDI input unit
533-1, 533-2 encoder
534-1, 534-2 decoder
535-1, 535-2 OETF conversion unit
536-1, 536-2 SDI output unit
537 storage
538 communication interface
541 recording-time inverse OETF unit
542 recording-time OOTF unit
543 color gamut conversion unit
544 linear gain unit
545 output inverse OOTF unit
546 output OETF unit
550 personal computer

The invention claimed is:

1. A signal processing system, comprising:
one or more processors configured to
apply a first optical-optical transfer function (OOTF) conversion corresponding to a first signal interface to an input linear video signal, wherein the input linear video signal is a high dynamic range (HDR) signal, and the first signal interface is one of Hybrid Log-Gamma (HLG), Perceptual Quantizer (PQ), and S-Log 3, and
apply a grayscale compression process corresponding to a second signal interface, the second signal interface being one of HLG, PQ, and S-Log 3 but different from the first signal interface.

2. The signal processing system according to claim 1, wherein the one or more processors are further configured to apply a second OOTF conversion corresponding to the second signal interface to an output of the grayscale compression process corresponding to the second signal interface.

3. The signal processing system according to claim 1, wherein the one or more processors are further configured to apply an inverse OOTF conversion corresponding to the second signal interface between the first OOTF conversion and the grayscale compression process corresponding to the second signal interface, an output of the grayscale compression process corresponding to the second signal interface being a second signal.

4. The signal processing system according to claim 3, wherein the one or more processors are configured to apply a grayscale compression process corresponding to the first signal interface to the input linear video signal to obtain a first signal, and apply a grayscale compression process corresponding to a third signal interface directly to an output of the first OOTF conversion process to obtain a third signal, the third signal interface being different from the first and second signal interfaces.

5. The signal processing system according to claim 4, wherein the one or more processors are further configured to apply the first OOTF conversion corresponding to the first signal interface to the first signal.

6. The signal processing apparatus according to claim 5, wherein the one or more processors are further configured to apply the first OOTF conversion corresponding to the first signal interface to the first signal in a monitor.

7. The signal processing system according to claim 2, wherein the one or more processors are further configured to apply the second OOTF conversion corresponding to the first signal interface to an output of the grayscale compression process corresponding to the second signal interface in a monitor.

8. The signal processing system according to claim 4, wherein the one or more processors are configured to selectively output the first signal, the second signal, or the third signal.

9. The signal processing system according to claim 4, wherein the one or more processors are further configured to output the first signal, the second signal, and the third signal in parallel.

10. The signal processing system according to claim 1, wherein the first OOTF conversion is performed by adding a system gamma.

11. The signal processing system according to claim 1, wherein the one or more processors are configured to apply the first OOTF conversion and the grayscale compression process in a camera controller.

12. The signal processing system according to claim 1, wherein the first signal interface is a reference signal interface.

13. The signal processing system according to claim 1, wherein each of the first signal interface and the second signal interface is a signal interface for high dynamic range (HDR) video signals.

14. The signal processing system according to claim 13, wherein the second signal interface is (HLG) or PQ.

15. The signal processing system according to claim 1, wherein the one or more processors are configured to apply a grayscale compression process corresponding to a third signal interface which is different from the first and the second signal interfaces.

16. The signal processing system according to claim 1, further comprising a control panel configured to receive user input.

17. A signal processing method, comprising:
applying, with one or more processors, a first optical-optical transfer function (OOTF) conversion corresponding to a first signal interface to an input linear video signal, wherein the input linear video signal is a high dynamic range (HDR) signal, and the first signal interface is one of Hybrid Log-Gamma (HLG), Perceptual Quantizer (PQ), and S-Log 3; and
applying, with the one or more processors, a grayscale compression process corresponding to a second signal interface the second signal interface, being one of HLG, PQ, and S-Log 3 but different from the first signal interface.

18. A non-transitory computer-readable medium encoded with computer-readable instructions that, when executed by one or more processors, cause the one or more processors to perform a method comprising:
applying a first optical-optical transfer function (OOTF) conversion corresponding to a first signal interface to an input linear video signal, wherein the input linear video signal is a high dynamic range (HDR) signal, and interface is one of Hybrid Log-Gamma (HLG), Perceptual Quantizer (PQ), and S-Log 3; and
applying a grayscale compression process corresponding to a second signal interface, the second signal interface being one of HLG, PQ, and S-Log 3 but different from the first signal interface.

* * * * *